(12) United States Patent
Moroto et al.

(10) Patent No.: US 8,290,299 B2
(45) Date of Patent: Oct. 16, 2012

(54) OBJECT OUTPUTTING METHOD AND INFORMATION PROCESSING APPARATUS

(75) Inventors: Mineko Moroto, Tokyo (JP); Yusaku Nagai, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1328 days.

(21) Appl. No.: 11/984,918

(22) Filed: Nov. 26, 2007

(65) Prior Publication Data

US 2008/0094364 A1    Apr. 24, 2008

Related U.S. Application Data

(63) Continuation of application No. PCT/JP2006/310261, filed on May 23, 2006.

(30) Foreign Application Priority Data

May 25, 2005 (JP) ................................ 2005-151958

(51) Int. Cl.
*G06K 9/20* (2006.01)

(52) U.S. Cl. ........ 382/283; 382/276; 382/282; 345/619; 345/629; 345/634; 345/636

(58) Field of Classification Search .................. 345/619, 345/625, 626, 629, 634, 636, 637; 463/30, 463/31, 32, 33, 34, 35; 382/276, 282, 283
See application file for complete search history.

(56) References Cited

U.S. PATENT DOCUMENTS

| | | | |
|---|---|---|---|
| 5,594,850 A | | 1/1997 | Noyama et al. |
| 5,793,361 A | * | 8/1998 | Kahn et al. ..................... 345/179 |
| 5,914,783 A | * | 6/1999 | Barrus ........................... 356/614 |
| 6,047,197 A | * | 4/2000 | Jarrad ............................ 455/566 |
| 6,781,598 B1 | * | 8/2004 | Yamamoto et al. ........... 345/629 |
| 7,864,198 B2 | * | 1/2011 | Moroto et al. ................ 345/629 |
| 2005/0004917 A1 | | 1/2005 | Ueda et al. |

FOREIGN PATENT DOCUMENTS

| | | |
|---|---|---|
| JP | 06-231275 | 8/1994 |
| JP | 10-326278 | 12/1998 |
| JP | 2000-322588 | 11/2000 |
| JP | 2001-224844 | 8/2001 |
| JP | 2003-46745 | 2/2003 |
| JP | 2003-132361 | 5/2003 |
| JP | 2003-271958 | 9/2003 |
| JP | 2003-296735 | 10/2003 |
| JP | 2003-309829 | 10/2003 |
| WO | WO 03/038757 A1 | 5/2003 |

* cited by examiner

*Primary Examiner* — My-Chau T Tran
(74) *Attorney, Agent, or Firm* — Kratz, Quintos & Hanson, LLP

(57) ABSTRACT

In order to display the image included in the original one on a display part together with outputting the object, a key in a keypad on an operation part by a user. Thereby, the key operated by the user is specified in both of the mask image creation part 32 and data notification part 35. Subsequently, it is judged whether there is the object inherently assigned to the specified key or not. When the judge result is affirmative, the object that corresponds to the operation of the key is output together with displaying the image included in the original one. As a result, a changing of output object when an image included in an original one is displayed together with outputting an object is able to perform simply for the user.

22 Claims, 32 Drawing Sheets

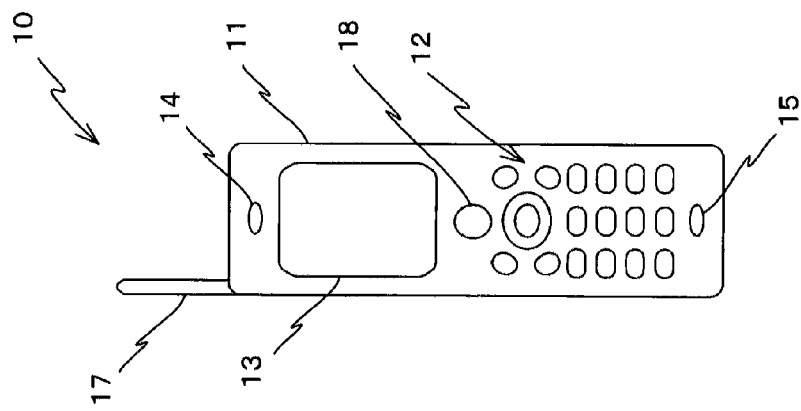
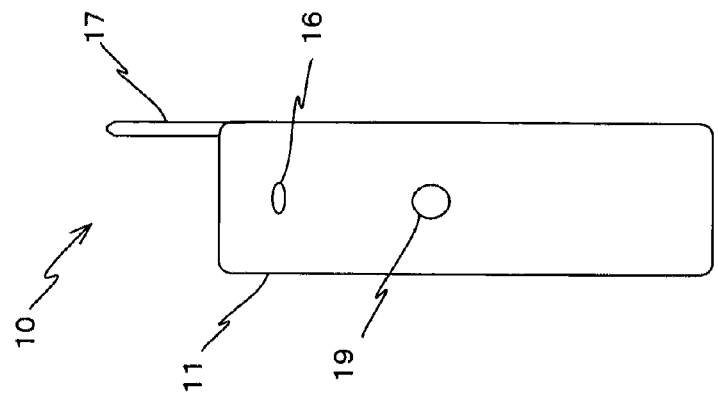

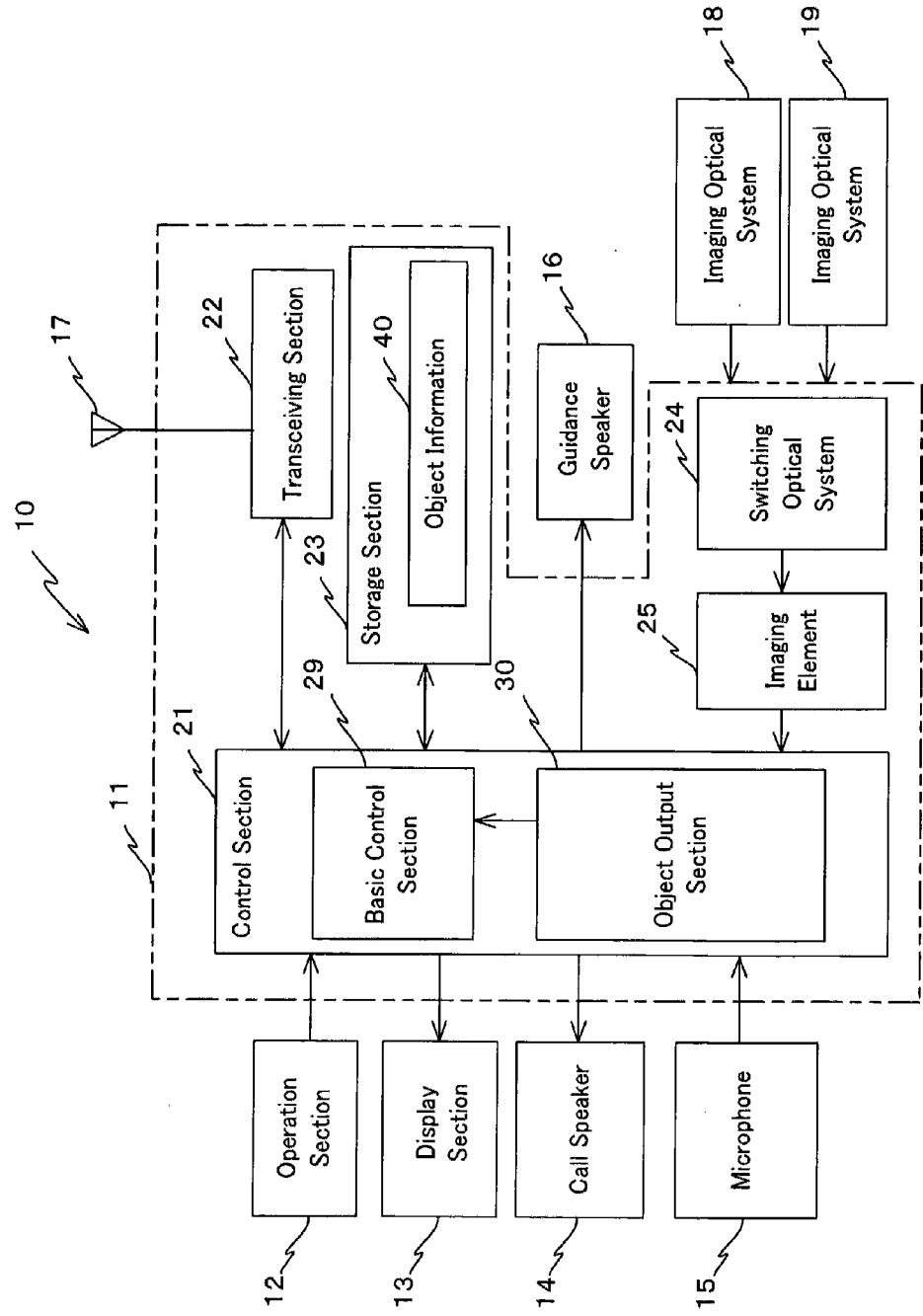

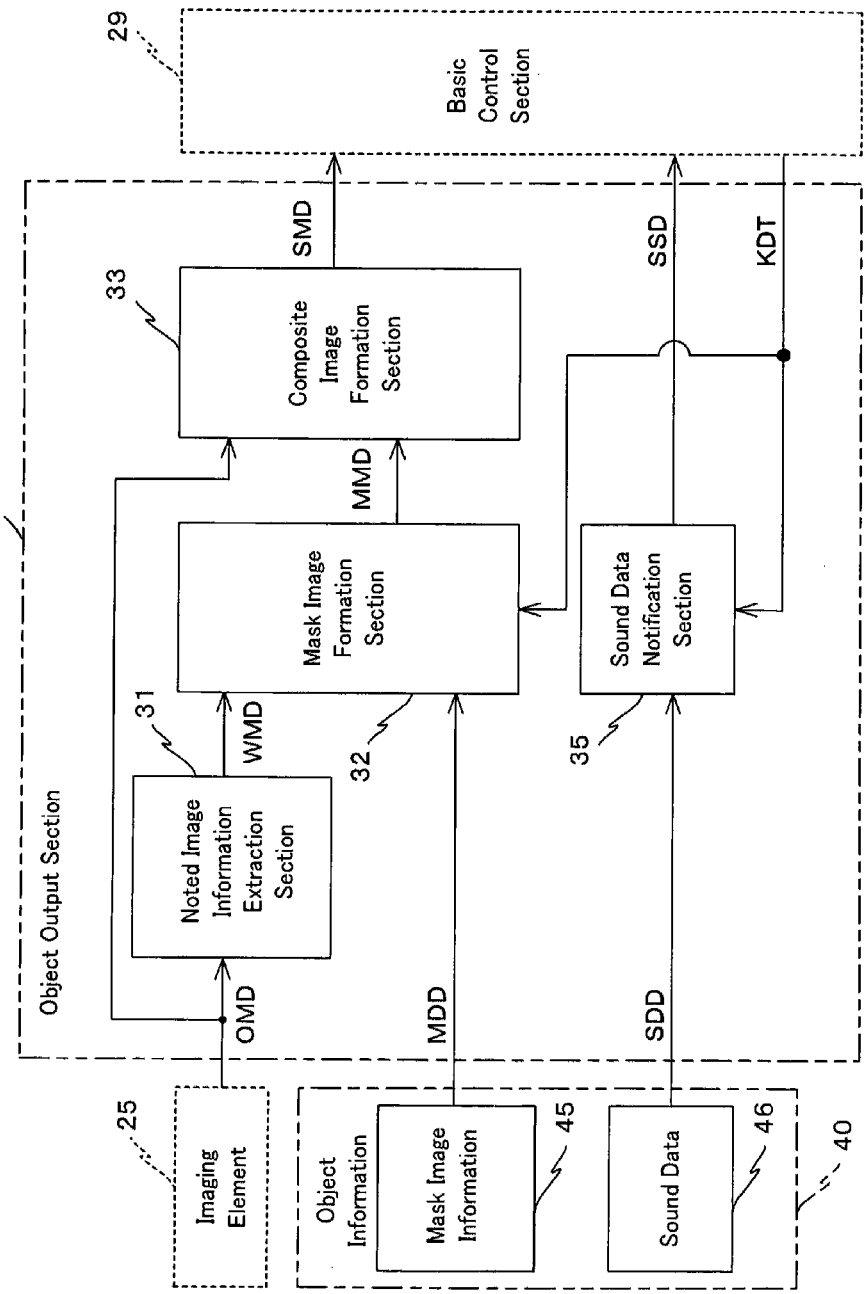

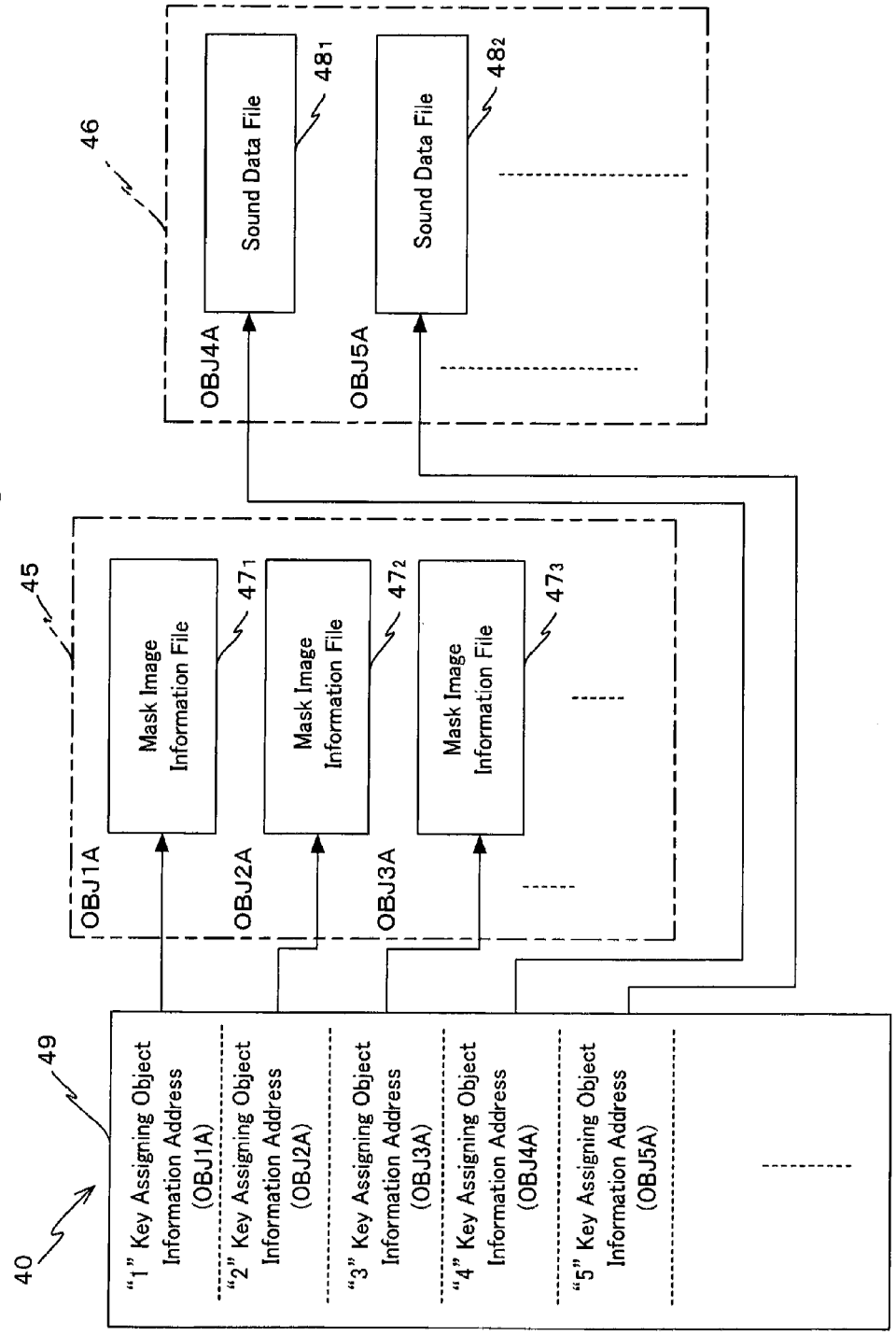

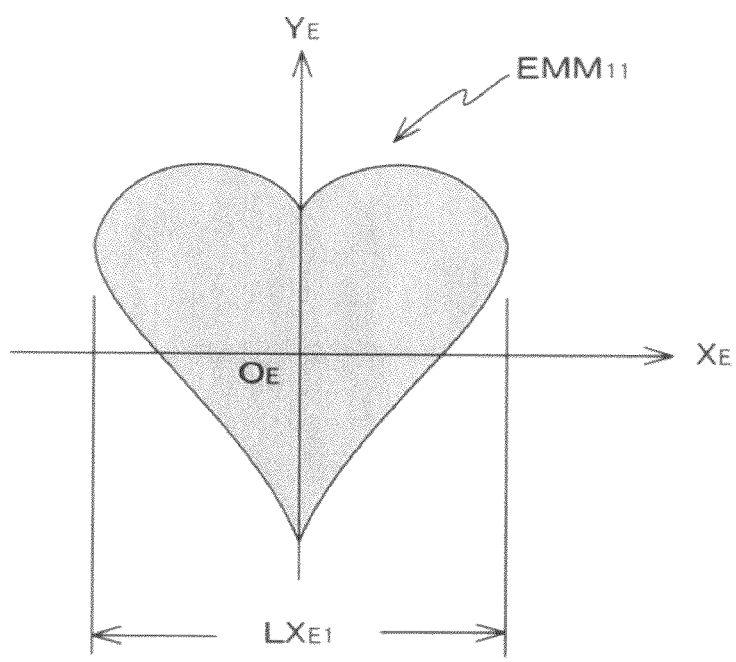

Fig. 8

411

```
<Simultaneous Display Designation >
    <Additional Image 1 Designation >
        <Display Position Designation = [Xw11, Yw11] Element Image
        Designation = [EMM11] Size Designation =[R1]>
    <End Additional Image 1 Designation >
    <Additional Image 2 Designation >
    <Additional Image 2 Designation >
        <Display Position Designation = [Xw12, Yw12] Element Image
        Designation = [EMM11] Size Designation = [R1]>
    <End Additional Image 2 Designation >
<End Simultaneous Display Designation >
```

<Additional Image 1 Designation >
   <Display Position Designation = [$X_{W2}$, $Y_{W2}$] Element Image Designation = [$EMM_{21}$] Size Designation = [$R_{21}$] Display Time Designation = [$T_{21}$]>
   <Display Position Designation = [$X_{W2}$, $Y_{W2}$] Element Image Designation = [$EMM_{22}$] Size Designation = [$R_{22}$] Display Time Designation = [$T_{22}$]>
   <Display Position Designation = [$X_{W2}$, $Y_{W2}$] Element Image Designation = [$EMM_{23}$] Size Designation = [$R_{23}$] Display Time Designation = [$T_{23}$]>
   <End Additional Image 1 Designation >

<Simultaneous Display Designation >
  <Additional Image 1 Designation >
    <Display Position Designation = [$X_{W31}$, $Y_{W31}$] Element Image Designation = [$EMM_{31}$] Size Designation = [$R_{31}$]>
  <End Additional Image 1 Designation >
  <Additional Image 2 Designation >
    <Display Position Designation = [$X_{W32}$, $Y_{W32}$] Element Image Designation = [$EMM_{32}$] Size Designation = [$R_{32}$] Display Time Designation = [$T_{32}$]>
    <Display Position Designation = [$X_{W33}$, $Y_{W33}$] Element Image Designation = [$EMM_{33}$] Size Designation = [$R_{33}$] Display Time Designation =[$T_{32}$]>
  <End Additional Image 2 Designation >
<End Simultaneous Display Designation >

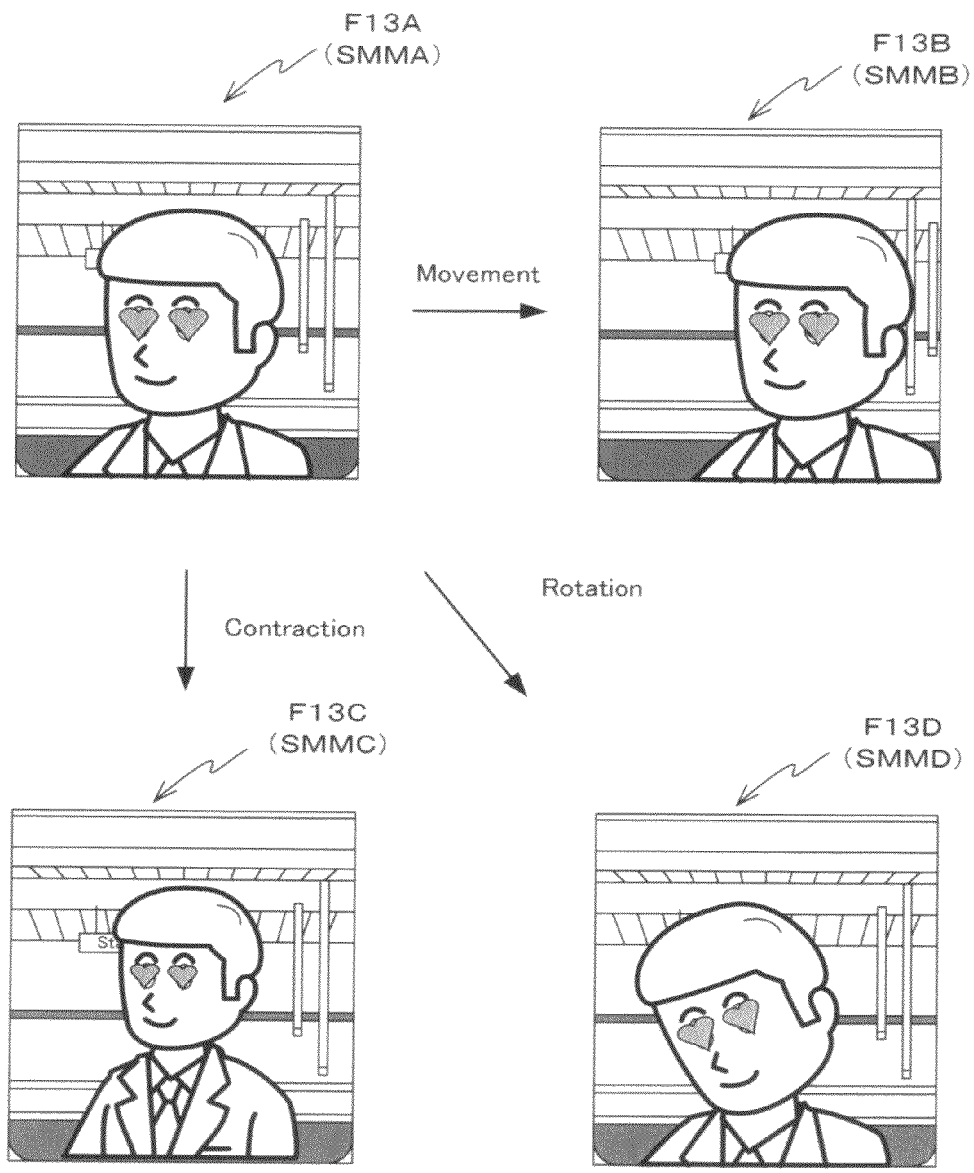

```
<Simultaneous Display Designation >
    <Additional Image 1 Designation >
        <Display Position Designation = [Xw11, Yw11] Element
        Image Designation = [EMM11] Size Designation = [R1]>
    <End Additional Image 1 Designation >

<Additional Image 2 Designation >
        <Display Position Designation = [Xw12, Yw12] Element
        Image Designation = [EMD11] Size Designation = [R1]
        Display Time Designation = [T32]>

<End Additional Image 2 Designation >

<background Image Designation >
        <background Image Designation = [BMMA]>
    <End background Image Designation >

<End Simultaneous Display Designation >
```

OBJECT OUTPUTTING METHOD AND INFORMATION PROCESSING APPARATUS

RELATED APPLICATION

This is a continuation application of the international patent application No. PCT/JP2006/310261 filed with application date: May 23, 2006. The present application is based on, and claims priority from, J.P. Application 2005-151958, filed on May 25, 2005, the disclosure of which is hereby incorporated by reference herein its entirety.

BACKGROUND OF THE INVENTION

The present invention relates to an object outputting method and an information processing apparatus, and in more detail relates to an object outputting method for simultaneously outputting an object with displaying an image included in an original image on display means in an information processing apparatus including display means and key input means, and an information processing apparatus using the object outputting method.

BACKGROUND ART

There have conventionally been various means for performing image processing to process an acquired original image. As technology for this type of image processing, there is facial recognition technology for recognizing that there is a facial image in an original image acquired using a digital camera or the like. There is also facial authentication technology that is a further advancement of this facial recognition technology, for extracting feature characteristics of a face and specifying an individual (refer to non-patent publication 1, and patent publications 1 and 2).

As background to this type of existing image processing technology relating to facial recognition, for example, there has been proposed technology, where the position and size of image for decoration is determined according to the positions of parts in the face when the face in the screen moved, then composite image is formed according to the move of the face in the screen (refer to patent reference 3). With this technology, the various face-compositing-images, which have different impression each other, are composed easily.

Also, there has been proposed video telephone technology, where an image acquired by a transmission side terminal is sent as is, and not only displayed on a receive side terminal, but in order to protect privacy of the user of the transmission side terminal sent to the receive side terminal after carrying out image processing to change a background image resulting from acquisition to another image (refer to patent reference 4).

[non-patent reference 1] Eyematic Japan Ltd. "technical information", published Dec. 29, 2003, internet [URL:http://www.eyematic.co.jp/tech.html]

[Patent reference 1] Japanese patent laid-open No. 2003-271958

[Patent reference 2] Japanese patent laid-open No. 2003-296735

[Patent reference 3] Japanese patent laid-open No. 2003-322588

[Patent reference 4] Japanese patent laid-open No. 2003-309829

SUMMARY OF THE INVENTION

Problems to be Solved by the Invention

Image processing technology of the above described related art, such as image recognition, image authentication, image tracking etc. are extremely good at being capable of application to a moving picture, and various application have been considered. For example, as an application, it is considered that user represents his inner motive and so on by modifying the original image corresponding to the interests of the user.

However, the user's inside motive and so on change depending on ever-changing results of picked-up images. Therefore, the representation, which matches with the interests of the users at some point, often does not match with the interests of the users at some future point.

From the above described view, it is required that modifying manner for changing over the original image to modified one conveniently. The technology in the patent reference 3 discloses to recognize a spoken instruction for changing a mode from the user. However, the sound recognition is not fit for the small-size device such as cellar phone, because a large amount of resource is needed to materialize the sound recognition.

The present invention has been conceived in view of the above described problems, and an object of the invention is to provide an object outputting method and an information processing apparatus capable of simply changing an object when the object is simultaneously displayed with an image composes of the original image and improving convenience for the user.

From the first aspect, the present invention is an object outputting method for simultaneously outputting an object with displaying an image included in an original image on a display means in an information processing apparatus which comprises the display means and key input means, comprising the steps of: identifying a key when the key in the key input means is operated; outputting an object corresponding to the operation of an identified key for simultaneous display with the image composes the original image on the display means, when the object is found.

With this object outputting method, when the user operates a key in the key input means for outputting an object simultaneously with displaying the image included in the original image, the operated key is identified in the identifying step. Next, it is decided that the object corresponding to the identified key is found or not. In the case that the result of the decision is affirmative, the identified object is simultaneously output with displaying the image included in the original image on the display means.

Accordingly, with the object outputting method of the present invention, it is possible to switch an object with one button control when the object is simultaneously displayed with the image included in the original image, thereby it improves the convenience for user.

In the object outputting method of the present invention, it is possible to output an object assigned uniquely to the identified key in the object outputting step.

Here, it is possible that the object assigned uniquely to the identified key is let to be a mask image, and a composite image including the mask image is displayed on the display means in the object outputting step. In this case, a composite image, which is synthesized from the image in the original image and the desired mask image chosen by key operation, is displayed on the display means.

Also, it is possible that the object outputting step comprises: specifying an noted image region, being a region for an image to be focused on, in an original image, and extracting noted image information containing information relating to position and size of the noted image within the original image; forming the mask image, based on the noted image information, and a mask image information containing at least one relationship information representing a relationship of position and size of the mask image to the noted image region, element image selection information representing selection of information of specified element images respectively corresponding to the relationship information, and at least one element image information selected using the element image selection information, and being corresponding to the identified key; and forming a composite image having the mask image superimposed on a noted image containing image that contains the noted image inside the noted image region at the same location and same size as for the original image.

In this case, at least one relationship information representing a relationship of position and size of the mask image to the noted image region, element image selection information representing selection of specified element image information respectively corresponding to the relationship information, and mask image information containing at least one element image information selected using the element image selection information, are registered in a predetermined mask image information file. In this case, "noted image region" is a region for a face in the original image containing a figure, for example, or a region capable of being specified by pictorial characteristics within an image assumed to be obtained from an original image.

As a premise for the existence of the mask image information file, first of all, in the noted image extraction step, the noted image region is specified in the original image, and noted image information containing information relating to the position and size of the noted image region within the original image is extracted. Continuing on, in the mask image data creation step, a mask image is created by displaying superimposed on the original image, based on the noted image information and the mask image information registered in the mask image information file. As a result, the mask image formed from element images selected using element image selection information contained in the mask image information is formed on the original image at a position determined using information connected to position of the noted image region and information representing a relationship to the noted image region in relationship information contained in the mask image information, at a size determined by information representing a relationship to information connected to size of the noted position in the original image and size of the noted image region in the relationship information. Then, in the composite image creating step, a composite image having the mask image superimposed on the noted image comprising image that includes a noted image inside the noted image region, such as a facial image within a facial image region, for example, at the same location and same size as for the original image, is formed.

As a result, it is possible to simply and appropriately form an image that a user has produced according their interests for a noted image comprising image.

Here, it is possible to make the noted image comprising image the original image. In this case, rendering of the original image according to the user's interests can be carried out by selecting a mask image.

Also, it is possible that the mask image information file further comprises background image selection information representing selection of information for a specified background image, and in the composite image formation step a specified display image containing the noted image is cut from the original image, and the composite image can be formed after a background addition image has been made the noted image comprising image having the specified display image superimposed on the specified background image at the same position and size as for the original image.

In this case, in the composite image formation step, first of all a specified display image containing a noted image such as a human figure image is cut from the original image for the case where the noted image is a facial image. Continuing on, the specified display image is superimposed on a background image designated using background image selection information contained in the mask image information file, to form a background addition image. The above described mask image is then superimposed on with the background addition image as the noted image comprising image. Accordingly, rendering of the specified display image, such as a figure and so forth, according to the user's interests can be carried out by selecting a mask image and a background image.

Also, it is possible for the mask image information to further comprise respective execution time information for element image display fixed by combining the relationship information and element image selection information corresponding to the relationship information. In this case, by forming a mask image according to the execution time information, it is possible to display respective desired element images for only display execution times set to respective to desired times, and it is possible to form a mask image to vary the dynamic.

Here, it is possible that the mask image information further comprises information for display of a plurality of types of element image display in time sequence, fixed by combining the relationship information and element image selection information corresponding to the relationship information, and for time sequence display designation for designating repeat of time sequence display. In this case, by forming a mask image according to the time sequence display designation information, it is possible to display a plurality of types of element image on the original image repeatedly in time sequence every desired time.

In the case that using the above described mask image information, it is possible for the mask image information to further comprise simultaneous display designation information for designating display of a plurality of types of element image display at the same time, fixed by combining the relationship information and element image selection information corresponding to the relationship information. In this case, it is possible to form a mask image having a desired plurality of element images respectively displayed as desired positions, and it is possible to form mask images of numerous variations.

Also, in the case that using the above described mask image information, it is possible for the information relating to the position of the noted image region to contain position information for a representative point of the noted image region of the original image. In this way, it is possible to make information representing a relationship with position of a noted region, in relationship information contained in the mask image information, information representing a relative relationship for a representative point of the noted image, and it is possible to simplify information representing a relationship with position of the noted image region in the relationship information. Note that, when information representing a relationship to position of the noted image region, in the relationship information, is made information representing a relative position with respect to the representative point of the noted image region, that the relative position information is made relative position information for the case where the noted image region has a reference size, and it is possible to convert value of the relative position information to a value corresponding to the size of the noted image region in the original image, according to a proportion of the size of the noted image in the original image and the size of the noted image region constituting the reference. It is also possible to make a value of the relative position information a value after normalization using size of the noted image region in the original image, and to convert a value of the relative position information to a value corresponding to the size of the noted image region in the original image.

Here, the information relating to the position of the noted image region can further contain inclination information for the noted image region of the original image. In this case, by using the inclination information for the noted region of the original image it is possible to form a composite image displaying a desired element image superimposed at a position corresponding to the inclination of the noted image region in the original image. It is also possible to cause display by holding inclination in the displayed element image corresponding to inclination of the noted image region in the original image. Incidentally, the inclination information can be a single angle information representing a two dimensional inclination of the noted image, or two or three angle information representing three dimensional inclination of the noted image.

As described above, when position information for a representative point of the noted image in the original image and inclination information for the noted image region in the original image are contained in the information relating to position of the noted image region, representative point of the noted image region is made the origin in the relationship information, and it is possible for coordinate position data of a coordinate system determining direction of a coordinate axis based on inclination of the noted image region to be included as display position information for the specified element image. In this case, the information in the relationship information with respect to a representative point of the noted image region can be simply interpreted as coordinate position information of a coordinate system that determined by direction of coordinate axis based on inclination of the noted image region, wherein the system has an origin as a representative point of the noted image region. Herein, the noted information is the information representing a relative position of information relating to the position.

Also, in the case that using the above described mask image information, it is possible for the relationship information to contain proportion information for size of the noted image region and size of the specified graphic at the time of display. In this case, even when size of the noted image within the original image is changed from moment to moment, it is possible to form a mask image containing element images of size appropriate to the size of the noted image region.

In the case that the object assigned properly to the identified key is output in the object outputting step, it is possible that the information processing apparatus further comprises sound output means, and the object assigned properly to the identified key is a sound object, wherein a composite image includes the mask image is displayed on the display means in the object outputting step. In this case, a desired sound object can be output from the sound output means simultaneously with displaying the image in the original image on the display means.

In the object outputting method of the present invention, it is possible that, when the key identified in the identifying step is a mask image update key, an update composite image including an update mask image to be displayed next on the display means in the object outputting step, wherein the update mask image is selected from a plurality of mask images of which displaying order is predetermined. In this case, it is possible to output sequentially composite images, each of which includes an update mask image selected from a plurality of mask images having predetermined displaying order, once the mask image update key is operated.

Here, the object outputting step comprises: specifying an noted image region, being a region for an image to be focused on, in an original image, and extracting noted image information containing information relating to position and size of the noted image within the original image; forming the update mask image, based on the noted image information, and a update mask image information containing at least one relationship information representing a relationship of position and size of the update mask image to the noted image region for the update mask image, element image selection information representing selection of information of specified element images respectively corresponding to the relationship information, and at least one element image information selected using the element image selection information; and forming a update composite image having the update mask image superimposed on a noted image containing image that contains the noted image inside the noted image region at the same location and same size as for the original image.

In this case, at least one relationship information representing a relationship of position and size of the update mask image to the noted image region, element image selection information representing selection of specified element image information respectively corresponding to the relationship information, and mask image information containing at least one element image information selected using the element image selection information, are registered in a predetermined update mask image information file.

As a premise for the existence of the update mask image information file, first of all, in the noted image extraction step, the noted image region is specified in the original image, and noted image information containing information relating to the position and size of the noted image region within the original image is extracted. Continuing on, in the update mask image data creation step, an update mask image is created by displaying superimposed on the original image, based on noted image information and the mask image information registered in the mask image information file. As a result, the update mask image formed from element images selected using element image selection information contained in the mask image information is formed on the original image at a position determined using information connected to position of a noted image region and information representing a relationship to the noted image region in relationship information contained in the update mask image information, at a size determined by information representing a relationship between information connected to size of the noted position in the original image and size of the noted image region in the relationship information. Then, in the composite image creating step, an update composite image having the update mask image superimposed on the noted image comprising image that includes a noted image inside the noted image region, such as a facial image within a facial image region, for example, at the same location and same size as for the original image, is formed.

Accordingly, it is possible to simply and appropriately form an image rendered as matching the interest of the user according to the predetermined sequence, regardless of whether the original image is a moving picture or a still image.

In the case of using such update mask image information, similar to the above described the case of using the mask information, it is possible to make the noted image comprising image the original image.

Also, similar to the above described the case of using the mask information, it is possible that the update mask image information file further includes background image selection information showing that information of a specified background image has been selected, and in the step of forming the update composite image, a specified display image containing the noted image is cut from the original image, and the update composite image is formed after a background addition image has been made noted image containing image having the specified display image superimposed on the specified background image at the same position and size as for the original image.

Also, in the case of using the update mask image information, similar to the above described the case of using the mask information, it is possible that the information relating to the position of the noted image region contains position information for a representative point of the noted image region of the original image. Also, it is possible that the information relating to the position of the noted image region contains inclination information for the noted image region of the original image, and it is possible that the relationship information contains coordinate position information in an coordinate system as display position information for the specified image, wherein an origin point of the coordinate system is the representative point of the noted region and direction of a coordinate axis is determined based on inclination of the noted image region.

Also, in the case of using the update mask image information, similar to the above described the case of using the mask information, it is possible that the relationship information contains proportion information for size of the noted image region and size for display time of a specified graphic.

Note that, in the image processing method of the present invention, it is possible to make the original image a moving picture.

From the second aspect, the present invention is an information processing apparatus comprising display means and key input means, wherein further comprises: operated key identifying means for identifying a key when the key in the key input means is operated; and object outputting means for outputting an object corresponding to operation of the key identified be the operated key identifying means, with displaying the image included in the original image on the display means, when the object is defined as an object corresponding to operation of the identified key.

With this information processing apparatus, when the user operates a key in the key input means for outputting an object simultaneously with displaying the image included in the original image, the operated key identifying means identify the operated key. Then, when an object corresponding to the identified key is exist, the object outputting means output the object simultaneously with displaying the image included in the original image on the display means.

In other words, with the image processing device of the present invention, an object is output using the object outputting method of the present invention. Accordingly, with the information processing apparatus of the present invention, it is possible to switch an object with one button control when the object is simultaneously displayed with the image included in the original image and increasing convenience of the user.

In the information processing apparatus of the present invention, it is possible that the object outputting means output an object assigned properly to the identified key.

Here, it is possible that an object assigned uniquely to the identified key is let to be a mask image, and the object outputting means display a composite image including the mask image on the display means. In this case, the composite image including the image in the original image and the desired mask image selected by the key operation is able to display on the display means.

In the case that an object assigned properly to the identified key is a mask image, it is possible that the object outputting means comprise: noted image information extracting means for specifying an noted image region, being a region for an image to be focused on, in an original image, and extracting noted information relating to position and size of the noted image region within the original image; storage means for storing a mask image information file registering mask image information containing at least one relationship information representing a relationship of position and size of the mask image to the noted image region, element image selection information representing selection of information for a specified element image respectively corresponding to the relationship information, and at least one element image information selected using the element image selection information; mask image formation means for forming a mask image displayed superimposed on the original image, based on the noted image information and the mask image information; and composite image formation means for forming a composite image having the mask image superimposed on an noted image containing image that includes the noted image inside the noted image region at the same location and same size as for the original image.

In this case, the noted image information extracting means specifies a noted image region in an original image, and extracts noted information relating to position and size of the noted image region within the original image. Continuing on, the mask image data formation means forms a mask image by displaying superimposed on the original image, based on noted image information and mask image information registered in the mask image information file. Then, composite image formation means forms a composite image having the mask image superimposed on a noted image comprising image that includes the noted image within the noted image region at the same location and same size as for the original image.

In the case that an object assigned properly to the identified key is a mask image, it is possible that the information processing apparatus comprises sound outputting means and the object assigned uniquely to the identified key is a sound object. In this case, the desired sound object can be output from the sound output means simultaneously with displaying the image in the original image on the display means.

In the information processing apparatus of the present invention, it is possible that, when the key identified in the identifying step is a mask image update key, the object outputting means output an update composite image including an update mask image to be displayed next on the display means, the update mask image being selected from a plurality of mask images of which displaying order is predetermined. In this case, it is possible to output sequentially the composite image including an update mask image selected from a plurality of mask images of which displaying order is predetermined, once the mask image update key is operated.

Here, it is possible that the object outputting means comprise: noted image information extracting means for specifying an noted image region, being a region for an image to be focused on, in an original image, and extracting noted information relating to position and size of the noted image region within the original image; composite image formation means for forming an initial mask image to be displayed initially based on the noted image information and a relationship information representing a relationship of position and size of the initial mask image to the noted image region for the initial update mask image, and then forming an initial composite image having the initial mask image superimposed on an noted image containing image that includes the noted image inside the noted image region at the same location and same size as for the original image; and forming an update mask image to be displayed next based on the noted image information and a relationship information representing a relationship of position and size of the update mask image to the noted image region for the update mask image, and then forming an update composite image having the initial mask image superimposed on an noted image containing image that includes the noted image inside the noted image region at the same location and same size as for the original image.

In this case, first of all, the noted image information extracting means specify noted image region in the original image, and extract noted image information containing information relating to the position and size of the noted image region within the original image is extracted. Continuing on, the mask image forming means create initial mask image to be superimposed on the original image, based on noted image information and initial mask image information. Then, composite image formation means create an initial composite image having the initial mask image superimposed on the noted image at the same location and same size as for the original image.

When a mask update key is operated during displaying the initial composite image, the mask image forming means create update mask image to be superimposed on the original image, based on noted image information and update mask image information. Then, composite image formation means create an update composite image having the update mask image superimposed on the noted image at the same location and same size as for the original image.

After that, once the mask update key is operated, the mask image forming means create next update mask image to be superimposed on the original image, based on noted image information and next update mask image information. Then, composite image formation means create an update composite image having the next update mask image superimposed on the noted image at the same location and same size as for the original image.

In the case of creating the mask image or the update mask image which are above described, it is possible that the information processing apparatus further comprise transmission means for transmitting a data of the composite image data formed by the composite image formation means. In this case, it is possible to notify an image which is rendered as matching the interest of the creator, to the receiver, since the transmitter can transmit the image to the receiving side.

With the information processing apparatus of this invention, it is possible that the information processing apparatus further comprise an image pick-up means for picking-up the original image. In this case, it is possible to make an image acquired using the image pick-up means the original image, and it is possible to easily and appropriately form an image that a user has rendered on the original image according to their interests. Note that, it is also possible for an image acquired by the imaging means to be a still image or a moving picture.

EFFECTS OF THE INVENTION

As is described above, according to the object outputting method and the information processing apparatus of the present invention, it is possible to simply change an object when the object is simultaneously displayed with the image included in the original image and increasing convenience of the user.

BRIEF DESCRIPTION OF DRAWINGS

FIG. 1A schematically shows the external structure of a front side view of a cellar phone unit of a first embodiment of the present invention;

FIG. 1B schematically shows the external structure of a rear side view of a cellar phone unit of the first embodiment of the present invention;

FIG. 2 is functional block diagram for describing the internal configuration of the cellar phone unit of FIG. 1A and FIG. 1B;

FIG. 3 is functional block diagram for describing the internal configuration of an object output section of FIG. 2;

FIG. 5 shows the configuration of the object information shown in FIG. 2;

FIG. 7 is a first drawing showing an example of an element image;

FIG. 8 is a first drawing showing example contents of the display designation file of FIG. 6A;

FIG. 9 is a second drawing showing example contents of the display designation file of FIG. 6A;

FIG. 10 is a third drawing showing example contents of the display designation file of FIG. 6A;

FIG. 13 is a first drawing showing an example of a composite image of the first embodiment;

FIG. 24 is a drawing showing example contents of the display designation file of FIG. 23;

DETAILED DESCRIPTION

<First Embodiment>

Figure 4A:
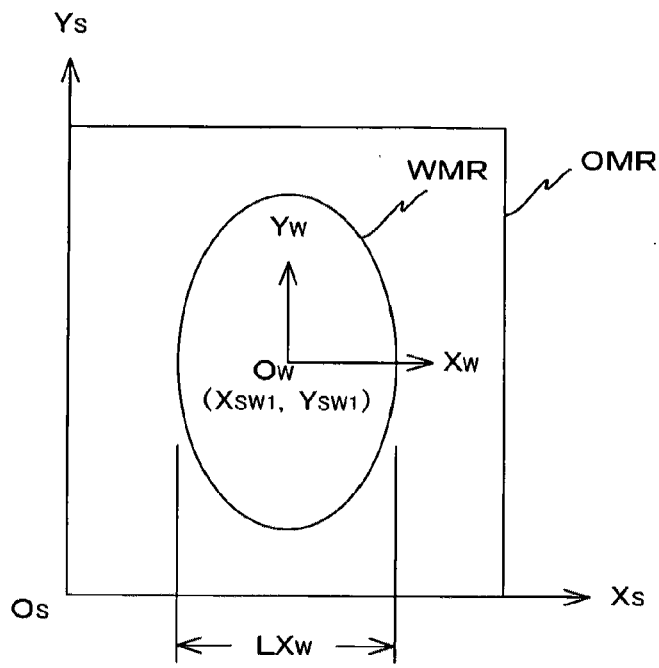
FIG. 4A is a first drawing for describing noted image region information.

A first embodiment of the present invention will be described in the following with reference to FIG. 1A-FIG. 19. The structure of a cellar phone unit 10, being a mobile communication terminal of a first embodiment, is shown schematically in FIG. 1A, FIG. 1B and FIG. 2. In this embodiment, a front view of the external appearance of the cellar phone unit 10 is shown in FIG. 1A, and a rear view of the external appearance of the cellar phone unit 10 is shown in FIG. 1B. Also, the functional block structure of the cellar phone unit 10 is shown in FIG. 2.

As shown comprehensively in FIG. 1A, FIG. 1B and FIG. 2, the cellar phone unit 10 comprises (a) a cellar phone body 11 provided with a control section 21 and so forth, which will be described later, (b) an operating section 12 having a numerical keypad for input of telephone numbers and function keys for inputting various commands such as operation mode switching, to the control section 21, and (c) a display section 13 having a liquid crystal display for displaying operation guidance, operating status, received messages etc. in response to commands from the control section 21. The cellar phone 10 also comprises of (d) a call speaker 14 for reproducing voice signals transmitted from a calling party at the time of a call and a microphone 15 for inputting sound at the time of a call, and (e) a guidance speaker 16 for generating ring alerts and guidance voice in response to commands from the control section 21. Further, the cellar phone unit 10 comprises of (f) an antenna 17 connected to a transmission section 22 for transceiving wireless signals between the unit and a base station. Still further, the cellar phone unit 10 comprises (g) an imaging optical system for taking pictures of an operator side operating the operating section 12 while looking at the display on the display section 13, that is, for carrying photography in a so-called self-facing state, and (h) an imaging optical system 19 for taking pictures facing towards the field of vision of the operator, that is, taking pictures in a so-called other-party state.

As shown in FIG. 2, the cellar phone body 11 comprises (i) a control section 21 for unified control of all operations of the cellar phone unit 10, and also performing various data processing, (ii) a transceiver section 22 for transceiving wireless signals to and from a base station via the antenna 17, and (iii) a storage section 23 for storing various data, which includes object information section 40. The cellar phone body 11 also comprises a switching optical system 24 for making either light passing through the imaging optical system 18 or light passing through the imaging optical system 19 be emitted towards an imaging element 25 that will be described later, under the control of the control section 21, and (iv) an imaging element 25 such as a CCD element for imaging an optical image formed by light on a light receiving surface via the switching optical system 24. In this case, the imaging element 25 carries out imaging operations under the control of the control section 21, and imaging results are notified to the control section 21.

The control section 21 is provided with a basic control section 29 and an object output section 30. In this case, the basic control section 29 controls of operation of the object output section 30, and also controls each element arranged external to the control section 21 and performs data processing besides object output processing, that will be described later.

As shown in FIG. 3, the object output section 30 mentioned above comprises a noted image extraction section 31, a mask image formation section 32 and a composite image formation section 33. The object output section comprises a sound data notification section 35.

The noted image extraction section 31 specifies a noted image region, such as a facial region of a specified person (for example, the user of the cellar phone unit 10) in the original image, for example, based on original image data OMD from the imaging element 25, and extracts noted image information WMD made up of position information for a representative point of the noted image region in the original image, inclination information of the noted image region in the original image, and size information of the noted image region.

Figure 4B:
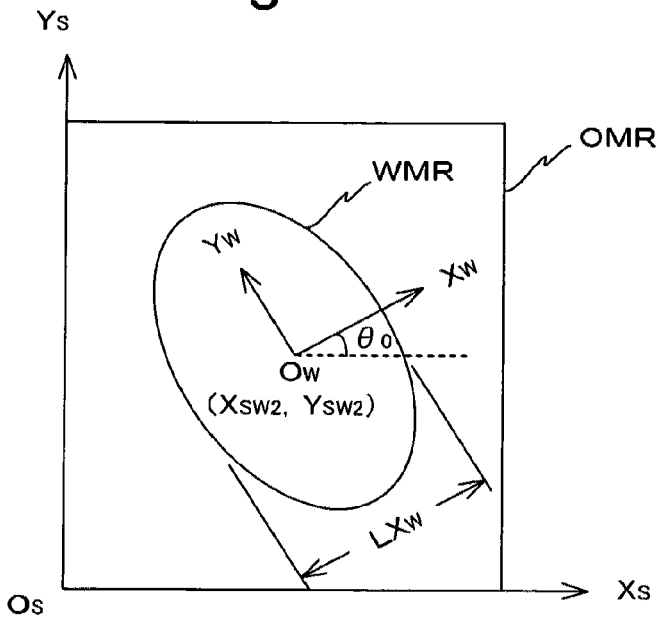
FIG. 4B is a second drawing for describing noted image region information.

Description will now be given of the extraction of the noted image information WMD. In the following, to simplify the description a 2-dimensional case will be dealt with disregarding the structure with respect to a display surface of body to be imaged in the original image, and the structure of the body to be images along a length direction in the original image will not be considered. Also, as shown in FIG. 4A and FIG. 4B, a noted image region WMR is specified in the original image region OMR. In this case, the case where the noted image region WMR is inclined on the reference (that is inclination angle $\theta_W=0$) is shown schematically in FIG. 4A. Also, the case where inclination is only $\theta_0$ from the reference inclination (inclination angle $\theta_W=\theta_0$) is shown in FIG. 4B. Each element position in the original image region OMR is represented using coordinate values of an $X_S Y_S$ coordinate system, which is the original image coordinate system. Also, in the noted image WMR, the representative point $O_W$ is made the origin, and when inclination angle $\theta_W=0$ an axis parallel to the $X_S$ axis is made an $X_W$ axis, and an axis parallel to the $Y_S$ axis is made a $Y_W$ axis to define a noted image coordinate system (that is an $X_W Y_W$ coordinate system). Inclination angle $\theta_W$ is represented by a counterclockwise angle.

In the case of FIG. 4A, after specifying a noted image region WMR in the original image region OMR, the noted image information extraction section 31 first of all obtains coordinate position $O_W(X_{S\,W1}, Y_{S\,W1})$ of the original image coordinate system for the representative point $O_W$, as position information for the representative point in the noted image WMR. In this case, as the representative point of the noted image region WMR, it is possible to adopt a distinctive point of a noted image region acquired using image analysis, such as taking a tip position of a nose in a facial image, in the case where the noted image us a facial image of a specified person.

Next, the noted image information extraction section 31 obtains a crossing angle $\theta_W$ of the $X_S$ axis and the $X_W$ axis (that is, the above described inclination angle $\theta_W$) as inclination information of the noted image WMR in the original image region OMR. Inclination angle $\theta_W$ is obtained by calculating a difference between a crossing angle of the $X_S$ axis and a characteristic direction as a noted image in the noted image region WMR defined with a predetermined inclination angle $\theta_W$ of "0", and a crossing angle of the $X_S$ axis and the characteristic direction in the noted image inside the original image. As this characteristic direction, for example, it is possible to adopt a long axis direction or short axis direction of an approximate ellipse in the case where the shape of the noted region WMR can approximate to elliptical, or a direction linked to a central position both eyes in a facial image in the case where the noted image is a facial image of a specified person. If the inclination angle $\theta_W$ (in the case of FIG. 4A, $\theta_W$=0) is obtained in this manner, it becomes possible to obtain the $X_W Y_W$ coordinate system (noted coordinate system) within the original image region OMR.

Next, the noted image information extraction section 31 obtains a characteristic length relating to the noted image region WMR, as size information for the noted image region WMR. In this embodiment, the width of the noted image region on the $X_W$ axis is made the characteristic length (width $LX_W$ in FIG. 4A). Note that, as the size information for the noted image region WMR, it is possible to adopt the width of the noted image region WMR on the $Y_W$ axis, maximum width of the noted image region WMR in the $X_W$ axis (or $Y_W$ axis) direction, a distance between two characteristic points in the noted image region (for example, a distance between the centers of two eyes in a facial image when the noted image is a facial image of a specified person), or the length of an $X_W$ axis component of the distance or the length of a $Y_W$ axis component of the distance, as well as the width $LX_W$ of the noted image region WMR on the $X_W$ axis.

In the case of FIG. 4B also, similarly to the case of FIG. 4A described above, after specifying a noted image region WMR in the original image region OMR, the noted image information extraction section 31 obtains position information, inclination information and size information for the representative point in the noted image WMR. Note that, in the case of FIG. 4B, a coordinate position $O_W(X_{S\,W2}, Y_{S\,W2})$ for the original image coordinate system of the representative point $O_W$ is obtained as the position information of the representative point, inclination angle $O_W=\theta_0$ is obtained as the inclination information of the noted region WMR, and a width $LX_W$ of the noted image region on the $X_W$ axis is obtained as the size information of the noted image region WMR.

Return to FIG. 3, in the case that mask image information MDD corresponding to the key input dada KDT notified from the basic control section 29 is stored within the object information section 40 in the above mentioned storage section 23, the image formation section 32 forms mask image data MMD based on noted image information WMD extracted by the noted image information extraction section 31, and mask image information MDD. Note that, formation of the mask image data MMD using the mask image information MDD and the mask image formation section 32 will be described later.

The above mentioned composite image formation section 33 forms composite image data SMD having the mask image superimposed on the original image based on the original image data OMD and the mask image data MMD. Note that, the composite image data SMMD formed by the composite image formation section 33 is notified to the basic control section 29.

In the case that sound data SDD corresponding to the key input dada KDT notified from the basic control section 29 is stored within the sound data section of the object information section 40 in the above mentioned storage section 23, the above mentioned sound data notification section 35 reads out and notifies the sound data SDD of the basic control section 29.

Note that, in this embodiment, the control section 21 is provided with a central processing unit (CPU), digital signal processor (DSP) and so forth. Then, various data processing is carried out by the basic image processing section 29 and the object output section 30, constituted by programs executed by the control section 21, in order to realize cellar phone functions, including mail interchange processing, output processing the object designated by key input operation, and besides that operational control of other structural elements is also performed.

As shown in FIG. 5, the above mentioned object information section 40 comprises an object registration table 49, a mask image information section 45, and sound data section 46. In the object registration table 49, a start address of a region, in which object information assigned to each of at least one of keys included in numerical keys of the operating section 12, is registered.

The mask image information section 40 includes mask image information files $47_1$, $47_2$, $47_3$, . . . . The sound data section 46 includes sound data files $48_1$, $48_2$, $48_3$, . . . .

In this embodiment, mask image information assigned to "1" key is stored in the mask image information file $47_1$. Also, the mask image information assigned to "2" key is stored in the mask image information file $47_2$ and the mask image information assigned to "3" key is stored in the mask image information file $47_3$. Further sound data information assigned to "4" key is stored in the sound data file $48_1$ and the sound data information assigned to "5" key is stored in the sound data file $48_2$.

Figure 6A:
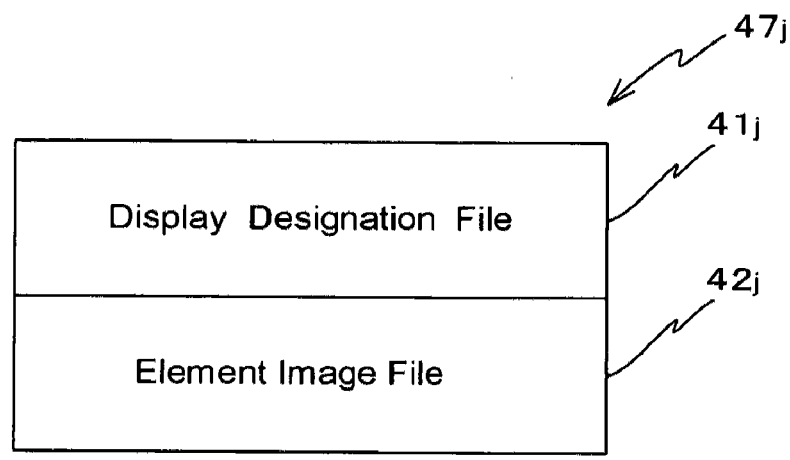
FIG. 6A is a drawing for describing the mask image information file structure of FIG. 5.

As shown in FIG. 6A, each of the mask image information files $47_j$ (j=1, 2, 3, . . . ) is comprised of (i) a display designation file $41_j$ storing display designation descriptors for designating as to with what relationship to the noted image region in the original image the mask image is displayed, and (ii) an element image file $42_j$ storing element image data designated using display designation descriptors in the display designation file $41_j$. Note that, the mask image information file 40 is provided to the cellar phone unit 10 from a contents server via a wireless circuit, or is provided after being formed by the user using a personal computer or the like by means of storage medium or an external interface, not shown in this figure.

Figure 6B:
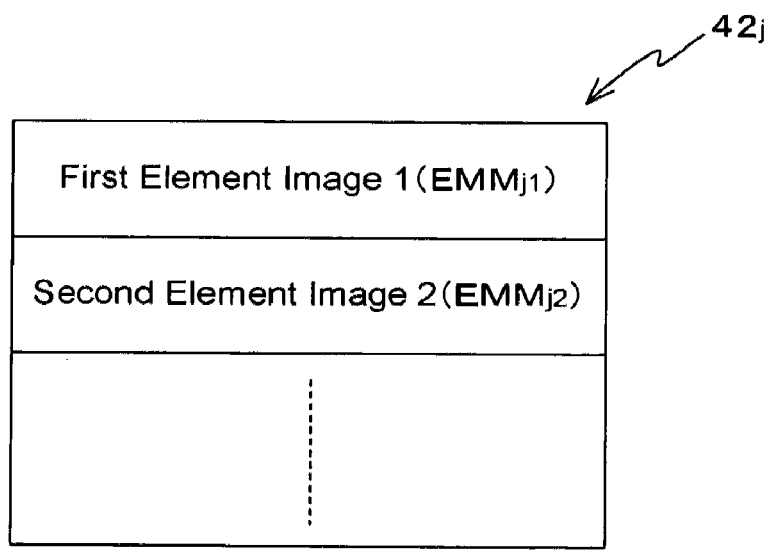
FIG. 6B is a drawing for describing the mask image information file structure of FIG. 5.

As shown in FIG. 6B, element images are stored in the element image file $42_j$. Note that, hereafter, the $i^{th}$ element image, stored in the element image file $42_j$, will be denoted element image $EMM_{ji}$. With FIG. 6B, a case is shown where there are a plurality of element images stored in the element image file $42_j$, but there may be cases where the number of element images stored in the element image file $42j$ is one, or cases where it is 2 or more. An element image $EMM_{ji}$, for example, there is a heart shaped image or a lip shaped image and so forth.

In this manner, the element image $EMM_{ji}$ is formed in a coordinate system inherent to the element image, which is in the $X_E Y_E$ coordinate system making a representative point (in FIG. 7 the center point of element image $EMM_{11}$) of element image $EMM_{ji}$ an origin $O_E$, as shown representatively for element image $EMM_{11}$ in FIG. 7. Then, a maximum width $LX_{Ei}$ (in FIG. 7 maximum width $LX_{E1}$) in the direction of the $X_E$ is used as the size information for element image $EMM_{ji}$. In FIG. 7, the element image $EMM_{ji}$ has been made as a heart shaped element image $EMM_{11}$, but the same applies even if it is an element image of a different shape or size.

Example of display designation descriptors for the above described display designation file $41_j$ are shown in FIG. 8, FIG. 9A and FIG. 10. Note that, the display designation descriptors of this embodiment are described in a format conforming to the SMIL (Synchronized Multimedia Integration Language) format.

In FIG. 8, an example for carrying out display designation to display the same element image steadily as two positions (for example, positions of two eyes in the case where the noted image is a facial image of a specified person) fixed in accordance with position, inclination and size of the noted image region is shown as the display designation file $41_1$. Specifically, display of additional image 1 and additional image 2, designated by <additional image 1 designation> and <addition image 2 designation> described between <simultaneous display designation> and <end simultaneous display designation> is designated.

Additional image 1 is designated using the descriptors between <additional image 1 designation> and <end additional image 1 designation>. Specifically, element image $EMM_{11}$ designated by "element image designation" is display at a coordinate position $(X_{W11}, Y_{W11})$ of the $X_W Y_W$ coordinate system in the case where size information for the noted image region WMR is a value $LX_{W0}$ constituting a predetermined reference, as designated using "display position designation". Also, as designated by "size designation", a maximum width in a $X_W$ axis direction of the element image $EMM_{11}$ at the time of display is made a length of proportion $R_1$ with respect to size $LX_W$ of the noted image region WMR. Note that, from the fact that display time designation, which will be described later, is not carried out, the element image $EMM_{11}$ for additional image 1 is designated to be displayed continuously.

Additional image 2 is designated using the descriptors between <additional image 2 designation> and <end additional image 2 designation>. Specifically, element image $EMM_{11}$ designated by "element image designation" is display at a coordinate position $(X_{W12}, Y_{W12})$ of the $X_W Y_W$ coordinate system in the case where size information for the noted image region WMR is a value $LX_{W0}$ constituting a predetermined reference, as designated using "display position designation". With respect to designation other than this, the same display designation as for the case of additional image 1 is carried out because the same designations as for the case of additional image 1 are carried out.

Note that, in the case of the display designation file $41_1$ as in FIG. 8, only element image $EMM_{11}$ is stored in the element image file $42_1$ corresponding to the display designation file $41_1$, as an element image.

In FIG. 9, an example for carrying out display designation to display the one additional image 1 whose display contents vary with time at a single position (for example, position of a mouth in the case where the noted image is a facial image of a specified person) fixed in accordance with position, inclination and size of the noted image region is shown as the display designation file $41_2$. Note that, in the display designation file $41_2$ of FIG. 9, a plurality of element images can not be displayed at the same time, which means that <simultaneous display designation> and <end simultaneous display designation> relating to the simultaneous display in FIG. 7 are not described.

Additional image 1 is designated using the descriptors between <additional image 1 designation> and <end additional image 1 designation>. Specifically, first of all an element image $EMM_{21}$ designated by a first "element image designation" is displayed at a coordinate position $(X_{W21}, Y_{W21})$ of the $X_W Y_W$ coordinate system in the case where size information $LX_E$ for a noted image region designated using a first "display position designation" is a value $LX_{E0}$ constituting a predetermined reference. Also, as designated by the first "size designation", a maximum width in a $X_E$ axis direction of the element image $EMM_{21}$ at the time of display is made a length of proportion $R_{21}$ with respect to size $LX_W$ of the noted image region WMR. Also, as designated by the first "display time designation", the element image $EMM_{21}$ is displayed for a time $T_{21}$.

If display of element image $EMM_{21}$ for time $T_{21}$ is completed, next an element image $EMM_{22}$ designated using a second "element image designation" is displayed at a position designated using a second "display position designation", that is, at the same position as for the case of element image $EMM_{21}$. Also, as designated by the second "size designation", a maximum width in a $X_E$ axis direction of the element image $EMM_{22}$ at the time of display is made a length of proportion $R_{22}$ with respect to size $LX_W$ of the noted image region WMR. Further, as designated by the second "display time designation", the element image $EMM_{22}$ is displayed for a time $T_{22}$.

If display of element image $EMM_{22}$ for time $T_{22}$ is completed, next an element image $EMM_{23}$ designated using a third "element image designation" is displayed at a position designated using a third "display position designation", that is, at the same position as for the case of element image $EMM_{21}$. Also, as designated by the third "size designation", a maximum width in a $X_E$ axis direction of the element image $EMM_{23}$ at the time of display is made a length of proportion $R_{23}$ with respect to size $LX_W$ of the noted image region WMR. Further, as designated by the third "display time designation", the element image $EMM_{23}$ is displayed for a time $T_{23}$.

If display of the element image $EMM_{21}$, element image $EMM_{22}$, and element image $EMM_{23}$, in time sequence in this way is completed, the element image $EMM_{21}$, element image $EMM_{22}$, and element image $EMM_{23}$ are displayed again in time sequence under the same conditions as described above. Display of the element image $EMM_{21}$, element image $EMM_{22}$, and element image $EMM_{23}$ in this way using designation conditions is repeated in time order.

An example for carrying out display designation in order to display one element image all the time at a single position fixed in accordance with position, inclination and size of the noted image region, and also displaying two different element images selectively in time order at two other positions determined in accordance with position, inclination and size of the noted image region is shown in FIG. 10 as an example of a display designation file $41_3$. Specifically, display of additional image 1 and addition image 2, designated by <additional image 1 designation> and <additional image 2 designation> described between <simultaneous display designation> and <end simultaneous display designation> is designated.

Additional image 1 is designated using the descriptors between <additional image 1 designation> and <end additional image 1 designation>. Specifically, element image $EMM_{31}$ designated by "element image designation" is displayed at a coordinate position $(X_{W3\,1}, Y_{W3\,1})$ of the $X_W Y_W$ coordinate system in the case where size information for the noted image region WMR is a value $LX_{W\,0}$ constituting a predetermined reference, as designated using "display position designation". Also, as designated by "size designation", a maximum width in a $X_W$ axis direction of the element image $EMM_{31}$ at the time of display is made a length of proportion $R_{31}$ with respect to size $LX_W$ of the noted image region WMR. Note that, because display time designation is not carried out, the element image $EMM_{31}$ for additional image 1 is designated to be displayed continuously.

Additional image 2 is designated using the descriptors between <additional image 2 designation> and <end additional image 2 designation>. Specifically, first of all an element image $EMM_{32}$ designated by a first "element image designation" is displayed at a coordinate position $(X_{W3\,2}, Y_{W3\,2})$ of the $X_W Y_W$ coordinate system in the case where size information for a noted image region WMR, as designated using a first "display position designation", is a value $LX_{W0}$ constituting a predetermined reference. Also, as designated by "size designation", a maximum width in a $X_W$ axis direction of the element image $EMM_{32}$ at the time of display is made a length of proportion $R_{32}$ with respect to size $LX_W$ of the noted image region WMR. Also, as designated by the first "display time designation", the element image $EMM_{32}$ is displayed for a time $T_{32}$.

With respect to additional image 2, if display of element image $EMM_{32}$ for $T_{32}$ is completed, next an element image $EMM_{33}$ designated by a second "element image designation" is displayed at a coordinate position $(X_{W3\,3}, Y_{W3\,3})$ of the $X_W Y_W$ coordinate system in the case where size information for a noted image region WMR, as designated using a second "display position designation", is a value $LX_0$ constituting a predetermined reference. Also, as designated by "size designation", a maximum width in a $X_W$ axis direction of the element image $EMM_{33}$ at the time of display is made a length of proportion $R_{33}$ with respect to size $LX_W$ of the noted image region WMR. Further, as designated by the second "display time designation", the element image $EMM_{33}$ is displayed for a time $T_{33}$.

Simultaneous display of element image $EMM_{31}$ and element image $EMM_{32}$, and simultaneous display of element image $EMM_{31}$ and element image $EMM_{33}$, by combining additional image 1 and additional image 2 in this way, are carried in time sequence. If these displays are completed, simultaneous display of element image $EMM_{31}$ and element image $EMM_{32}$, and simultaneous display of element image $EMM_{31}$ and element image $EMM_{33}$, are again carried out in time sequence under the same conditions as described above. Simultaneous display of element image $EMM_{31}$ and element image $EMM_{32}$, and simultaneous display of element image $EMM_{31}$ and element image $EMM_{33}$ in this way, are repeatedly carried out in time sequence.

In the following description will be given of the operation of forming a composite image with a mask image superimposed on an original image, in the cellar phone unit 10 constructed as described above.

Figure 11A:
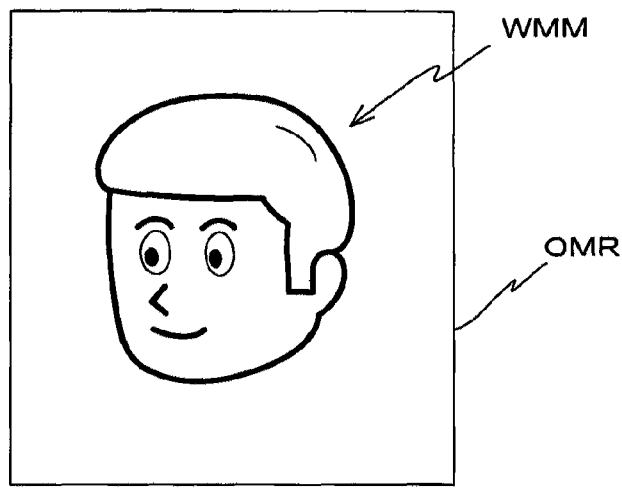
FIG. 11A is a drawing showing an example of a noted image.
Figure 11B:
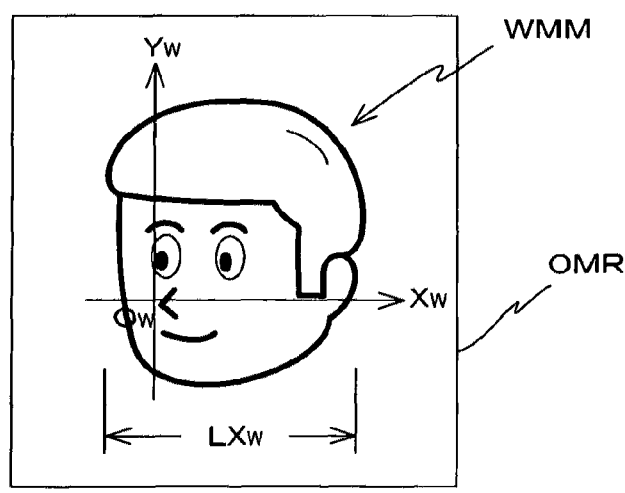
FIG. 11B is a drawing showing an example for describing the noted image coordinate system in FIG. 9A.

As a prerequisite, the above mentioned information has already stored in the object information section 40. Also, the original image is an image that is formed on an imaging screen of the imaging element 25 by means of the imaging optical system 18 and the switching optical system 24. The noted image WMM is a facial image of a specified person, such as shown in FIG. 11A. Then, as shown in FIG. 11B, a tip position of a nose in the noted image WMM is made an origin $O_W$, a direction connecting both sides is made an $X_W$ axis direction, and an $X_W Y_W$ coordinate system (noted image coordinate system) with a direction orthogonal to the $X_W$ axis direction being a $Y_W$ axis direction is defined. Note that, the origin $O_W$ and the $X_W$ axis direction are obtained by analyzing the noted image in the original image, and the $Y_W$ axis direction is obtained based on the obtained $X_W$ axis direction.

Further, it is assumed that the cellar phone unit 10 has been in object output mode, portable, and the basic control section 29 notifies the key input data of the object output section 30 when any one of the numerical keys is presses.

<<Object Outputting Example by Pressing of "1" Key>>

First of all, an object outputting example by pressing of "1" key will be described. This example, in FIG. 8 described above, is an outputting example of a composite image having a position of two eyes as display positions, and element image $EMM_{11}$ being the heart shaped graphic image shown in FIG. 7, for displaying a mask image that is the element image $EMM_{11}$ displayed in a size of proportion $R_1$ with respect to length value $LX_W$ representing size of noted image WMM, superimposed on an original image.

When "1" key is pressed by the user, the basic control section 29 recognizes the press of any one of the numerical keys and reports key input data to the mask image formation section 32 and the sound data notification section 35. The sound data notification section 35, which received the key input data, refers the object registration table 49 and decides whether the sound data assigned to the "1" key is exist or not. In this instance, since the object assigned to the "1" key is the mask image as above mentioned, the sound data notification section 35 decides that the sound data assigned to the "1" key is not exist. As a result, the sound data notification section 35 does not perform action for object outputting and waits the next key input data.

On the other hand, the mask image formation section 32, which received the key input data notification, refers the object registration table 49, and decides whether the mask image assigned to the "1" key is exist or not. As a result of this decision is affirmative; the mask image formation section 32 reads out the contents of the mask image information file $47_1$.

Figure 12A:
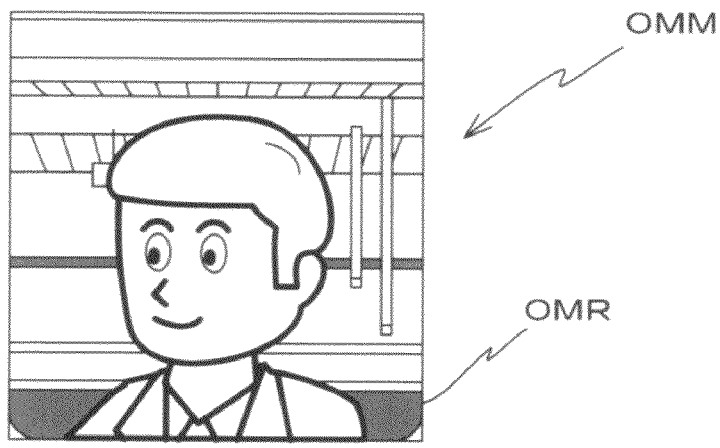
FIG. 12A is a drawing showing an example of an original image.

In the parallel to the above mentioned action, original image data OMD, being data for an original image OMM imaged on the imaging element 25, is notified to the noted image information extraction section 31. Note that, the original image data OMD is also notified to the composite image formation section 33 at the same time (refer to FIG. 3). In this case, the acquired original image OMM is shown in FIG. 12A.

The noted image information extraction section 31 image processes the notified original image OMM to extract a region of the noted image WMM. Continuing on, the noted image information extraction section 31 analyzes the noted image WMM, to obtain a position of a tip of a nose $(X_{S\,W}, Y_{S\,W})$ in the noted image WMM of the original image coordinate system ($X_S Y_S$ coordinate system) as a position of an origin $O_W$ for the noted image coordinates ($X_W Y_W$ coordinate system), and obtain a direction in which a line segment linking two central position of pupils of two eyes extends as an $X_W$ axis direction for the $X_W Y_W$ coordinate system. A crossing angle $\theta_W$ of the obtained $X_W$ axis direction and the $X_S$ axis direction is then obtained. Further, the noted image information extraction section 31 obtains a width $LX_W$ of the noted image WMM on the $X_W$ axis. The noted image information extraction section 31 then notifies position $(X_{S\,W}, Y_{S\,W})$ as position information for the noted image region, angle $\theta_W$ as inclination information for the noted image region, and length $LX_W$ as size information of the noted image region to the mask image formation section 32 as noted image information data WMD.

The mask image formation section 32 that has received the noted image information data WMD first of all calculates display position $(X_{E\,1\,1}, Y_{E\,1\,1})$ in the $X_S Y_S$ coordinate system of the element image $EMM_{11}$ in the additional image 1, using the following equations (1) and (2).

$$X_{E\,1\,1} = (LX_W/LX_0)(X_{W\,1\,1} * \cos\theta_W + Y_{W\,1\,1} * \sin\theta_W) + X_S \quad (1)$$

$$Y_{E\,1\,1} = (LX_W/LX_0)(-X_{W\,1\,1} * \sin\theta_W + Y_{W\,1\,1} * \cos\theta_W) + Y_S \quad (2)$$

Next the mask image formation section 32 calculates a magnification $M_{11}$ for expansion or contraction of the element image $EMM_{11}$ in the additional image 1 from the following equation (3).

$$M_{1\,1} = R_1 * LX_W/LX_{E\,1} \quad (3)$$

Next, the mask image formation section 32 carries out expansion or contraction of the element image $EMM_{11}$ with a magnification $M_{11}$ and with origin $O_E$ as a center in the $X_S Y_S$ coordinate system. Continuing on, the mask image formation section 32 rotates the expanded or contracted element image $EMM_{11}$ by angle $\theta_W$ with origin $O_E$ as a center in the $X_S Y_S$ coordinate system. The element image $EMM_{11}$ that has been expanded or contracted and rotated is then arranged in the $X_S Y_S$ coordinate system so that a coordinate position $(X_{E\,1\,1}, Y_{E\,1\,1})$ in the $X_S Y_S$ coordinate system becomes the position of the origin $O_E$.

Next, similarly to the case for additional image 1, the mask image formation section 32 calculates display position $(X_{E\,1\,2}, Y_{E\,2\,1})$ in the $X_S Y_S$ coordinate system of the element image $EMM_{11}$ in the additional image 2, using the following equations (4) and (5).

$$X_{E\,1\,2} = (LX_W/LX_0)(X_{W\,1\,2} * \cos\theta_W + Y_{W\,1\,2} * \sin\theta_W) + X_S \quad (4)$$

$$Y_{E\,1\,2} = (LX_W/LX_0)(-X_{W\,1\,2} * \sin\theta_W + Y_{W\,1\,2} * \cos\theta_W) + Y_S \quad (5)$$

Subsequently, similarly to the case for additional image 1, the mask image formation section 32 calculates a magnification $M_{12}$ for expansion or contraction of the element image $EMM_{11}$ in the additional image 2 from the following equation (6).

$$M_{1\,2} = R_1 * LX_W/LX_{E\,1} \quad (6)$$

Next, the mask image formation section 32 carries out expansion or contraction of the element image $EMM_{11}$ with a magnification $M_{12}$ and with origin $O_E$ a center in the $X_S Y_S$ coordinate system as. Continuing on, the mask image formation section 32 rotates the expanded or contracted element image $EMM_{11}$ by angle $\theta_W$ with origin $O_E$ as a center in the $X_S Y_S$ coordinate system. The element image $EMM_{11}$ that has been expanded or contracted and rotated is then arranged in the $X_S Y_S$ coordinate system so that a coordinate position $(X_{E\,1\,2}, Y_{E\,1\,2})$ in the $X_S Y_S$ coordinate system becomes the position of the origin $O_E$.

Figure 12B:
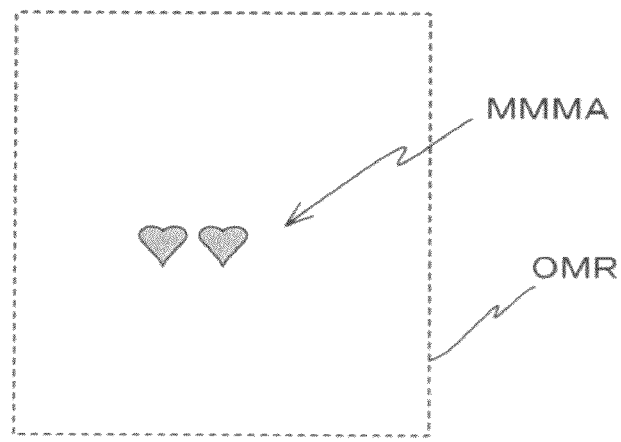
FIG. 12B is a drawing showing an example of a mask image corresponding to FIG. 8.
Figure 14A:
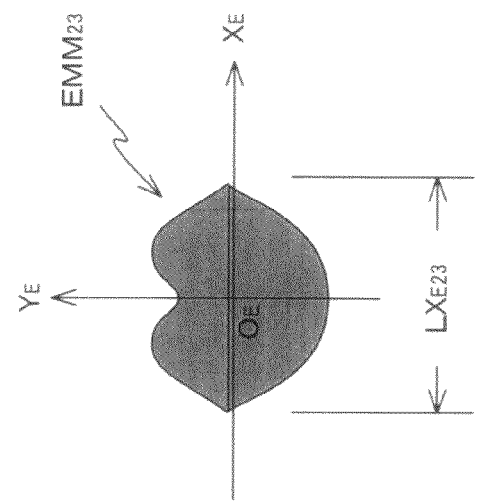
FIG. 14A is a second drawing showing an example of an element image.
Figure 14B:
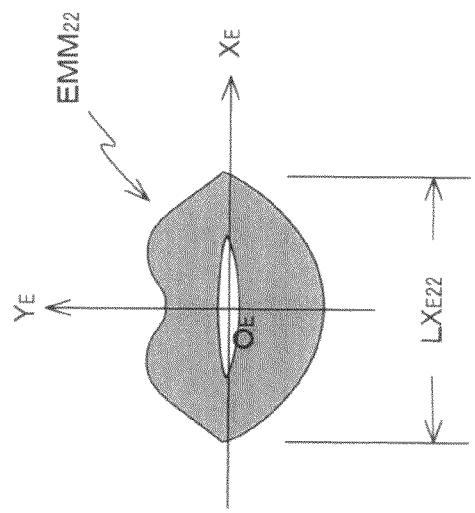
FIG. 14B is a third drawing showing an example of an element image.
Figure 14C:
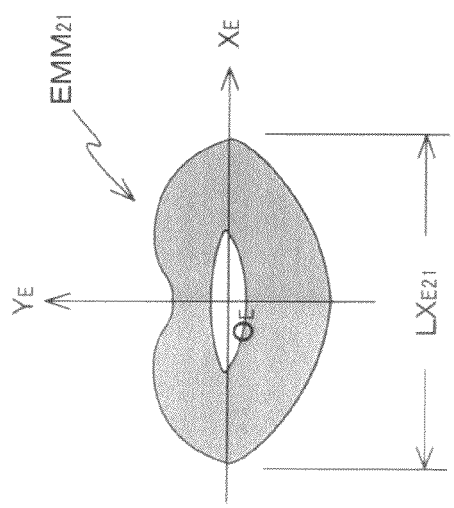
FIG. 14C is a fourth drawing showing an example of an element image.

The result of the above processing is that a mask image MMMA in FIG. 12B is formed. The mask image formation section 32 then notifies data of the mask image MMMA to the composite image formation section 33 as mask image data MMD.

The composite image formation section 33 that has received the mask image data MMD and the original image data OMD forms a composite image SMMA having the mask image MMMA superimposed on the original image data OMM. The composite image SMMA formed in this way is represented as image F13A in FIG. 13.

As described above, the composite image for the case of this example is formed. Therefore, even if the noted image WMM of the original image is moved parallel from the above described example during imaging, as shown in image F13B, the same as with the above described case a composite image SMMB is formed having a mask image with the element image $EMM_{11}$ displayed at size that is a proportion designated according to size of the noted image region at a position of two eyes in the noted image WMM superimposed on the original image.

Also, even if the noted image WMM of the original image is contracted during imaging, as shown in image F13C, the same as with the above described case a composite image SMMC is formed having a mask image with the element image $EMM_{11}$ displayed at size that is a proportion designated according to size of the noted image region at a position of two eyes in the noted image WMM superimposed on the original image. Also, even if the noted image WMM of the original image is rotated during imaging, as shown in image F13D, the same as with the above described case a composite image SMMD is formed having a mask image with the element image $EMM_{11}$ displayed having a size that is a proportion designated according to size of the noted image region at a position of two eyes in the noted image WMM, and having the same inclination as the inclination of the noted image WMM within in the original image, superimposed on the original image. Note that, when the noted image WMM in the original image is contracted, expanded or rotated during imaging, it is generally accompanied by change in coordinate position in the original image coordinate system ($X_S Y_S$ coordinate system) for nose tip position in the noted image region.

The composite image data SMD formed in the above mentioned manner is reported from the composite image formation section 33 to the basic control section 29. The basic control section 29, which received the composite image data SMD, displays the composite image SMM(D) on the display section or transmits the composite image SMM(D) via transmission section 22 according to the instruction by the user via the operation section 22.

<<Object Outputting Example by Pressing of "2" Key>>

Next, an object outputting example by pressing of "2" key will be described. This example is an example of a composite image where, in FIG. 9 described above, a mask image having element image $EMM_{21}$ shown in FIG. 14A, element image $EMM_{22}$ shown in FIG. 14B and element image $EMM_{23}$ shown in FIG. 14C displayed in time sequence, with the position of a mouth as display position, is superimposed on the original image.

Note that, element images $EMM_{21}$, $EMM_{22}$ and $EMM_{23}$ are displayed in a size corresponding to "size information" being designated by the descriptor of FIG. 9. Specifically, element image $EMM_{21}$ is displayed in a size of proportion $R_{21}$ with respect to length value $LX_W$ representing size of the noted image WMM. Also, element image $EMM_{22}$ is displayed in a size of proportion $R_{22}$ with respect to length value $LX_W$. Further, element image $EMM_{23}$ is displayed in a size of proportion $R_{23}$ with respect to length value $LX_W$.

When "2" key is pressed by the user, similarly to the press of the "1" key, the basic control section 29 recognizes the press of any one of the numerical keys and reports key input data to the mask image formation section 32 and the sound data notification section 35. The sound data notification section 35 does not perform action for object outputting and waits the next key input data, because the object assigned to the "2" key is the mask image as above mentioned. On the other hand, the mask image formation section 32 refers the object registration table 49 and reads out the contents of the mask image information file $47_2$.

Similarly to the press of the "1" key, the noted image information extraction section 31 notifies position ($X_{S\,W}$, $Y_{S\,W}$) as position information for the noted image region, angle $\theta_W$ as inclination information for the noted image region, and length $LX_W$ as size information of the noted image region to the mask image formation section 32 as noted image information data WMD. The mask image formation section 32 that has received the noted image information data WMD first of all calculates display position ($X_{E\,2}$, $Y_{E\,2}$) in the $X_S Y_S$ coordinate system of the first element image $EMM_{21}$ in the additional image 1, using the following equations (7) and (8).

$$X_{E\,2} = (LX_W/LX_0)(X_{W\,2} * \cos\theta_W + Y_{W\,2} * \sin\theta_W) + X_{S\,W} \quad (7)$$

$$Y_{E\,2} = (LX_W/LX_0)(-X_{W\,2} * \sin\theta_W + Y_{W\,2} * \cos\theta_W) + Y_{S\,W} \quad (8)$$

Next the mask image formation section 32 calculates a magnification $M_{21}$ for expansion or contraction of the first element image $EMM_{21}$ from the following equation (9).

$$M_{21} = R_{21} * LX_W/LX_{E\,21} \quad (9)$$

Next, similarly to the press of the "1" key described above, the mask image formation section 32 carries out expansion or contraction of the element image $EMM_{21}$ with a magnification $M_{21}$ and with origin $O_E$ as a center in the $X_S Y_S$ coordinate system. Continuing on, the mask image formation section 32 rotates the expanded or contracted element image $EMM_{21}$ by angle $\theta_W$ with origin $O_E$ in the $X_S Y_S$ coordinate system as a center. The element image $EMM_{21}$ that has been expanded or contracted and rotated is then arranged in the $X_S Y_S$ coordinate system so that a coordinate position ($X_{E\,2}$, $Y_{E\,2}$) in the $X_S Y_S$ coordinate system becomes the position of the origin $O_E$.

Figure 15:
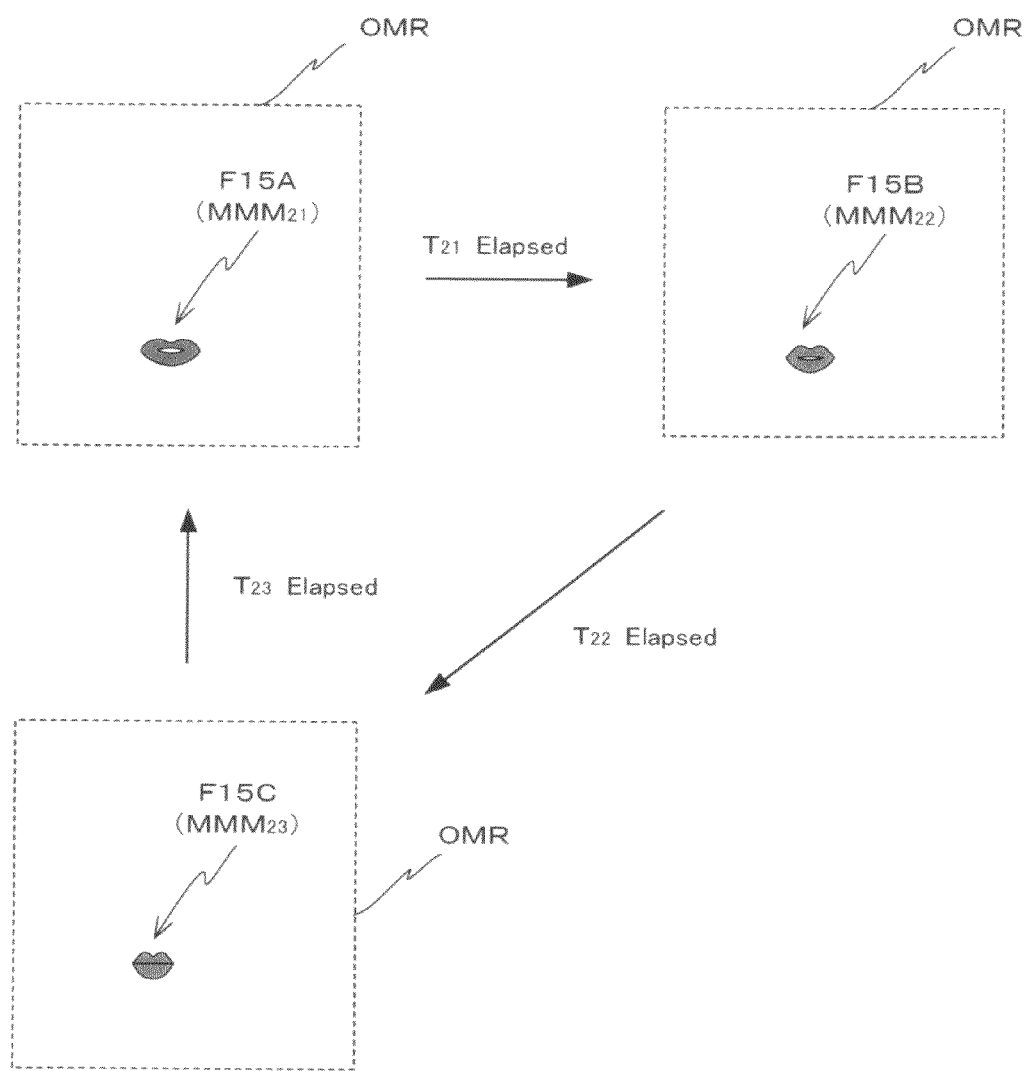
FIG. 15 is a drawing showing an example of a mask image corresponding to FIG. 9.

The result of the above processing is that a mask image $MMM_{21}$ such as is shown by image F15A in FIG. 15 is formed. The mask image formation section 32 then notifies data of the mask image $MMM_{21}$ to the composite image formation section 33 as mask image data MMD.

The composite image formation section 33 that has received this mask image data MMD and the original image data OMD forms a composite image $SMM_{21}$ having the mask image MMM superimposed on the original image OMM. The composite image $SMM_{21}$ formed in this way is represented as image F16A in FIG. 16.

After that, during time $T_{21}$, the mask image formation section 32 forms the mask image displaying element image $EMM_{21}$ in a size of proportion $R_{21}$ with respect to length value $LX_W$ representing the size of the noted image WMM, with mouth position in the noted image WMM as display position. As a result, during time $T_{21}$, the composite image formation section 33 sequentially forms the composite image having the mask image that is the element image $EMM_{21}$ that has been expanded or contracted at magnification $M_{21}$ at the position of the mouth in the noted image WMM of the original image.

In this manner, once time $T_{21}$ has elapsed, the mask image formation section 32 calculates display position ($X_{E\,2}$, $Y_{E\,2}$) in the $X_S Y_S$ coordinate system of the second element image $EMM_{22}$ in the additional image 1, using the above described equations (7) and (8). Continuing on, the mask image formation section 32 calculates a magnification $M_{22}$ for expansion or contraction of the second element image $EMM_{22}$ from the following equation (10).

$$M_{22} = R_{22} * LX_W/LX_{E\,22} \quad (10)$$

Next, similarly to the case of the first element image $EMM_{21}$ described above, the mask image formation section 32 carries out expansion or contraction of the element image $EMM_{22}$ with a magnification $M_{22}$ and with origin $O_E$ as a center in the $X_E Y_E$ coordinate system. Continuing on, the mask image formation section 32 rotates the expanded or contracted element image $EMM_{22}$ by angle $\theta_W$ with origin $O_E$ as a center in the $X_S Y_S$ coordinate system. The element image $EMM_{22}$ that has been expanded or contracted and rotated is then arranged in the $X_S Y_S$ coordinate system so that a coordinate position ($X_{E\,2}$, $Y_{E\,2}$) in the $X_S Y_S$ coordinate system becomes the position of the origin $O_E$.

The result of the above processing is that a mask image $MMM_{22}$ such as is shown by image F15B in FIG. 15 is formed. The mask image formation section 32 then notifies data of the mask image $MMM_{22}$ to the composite image formation section 33 as mask image data MMD.

The composite image formation section 33 that has received this mask image data MMD and the original image data OMD forms a composite image $SMM_{22}$ having the mask image MMM superimposed on the original image OMM. The composite image $SMM_{22}$ formed in this way is represented as image F16B in FIG. 16.

After that, during time $T_{22}$, the mask image formation section 32 forms the mask image displaying element image $EMM_{22}$ in a size of proportion $R_{22}$ with respect to length value $LX_W$ representing the size of the noted image WMM, with mouth position in the noted image WMM as display position. As a result, during time $T_{22}$ the composite image formation section 33 forms the composite image having the mask image that is the element image $EMM_{22}$ that has been expanded or contracted at magnification $M_{22}$ at the position of the mouth in the noted image WMM of the original image.

In this manner, once time $T_{22}$ has elapsed, the mask image formation section 32 calculates display position ($X_{E\,2}$, $Y_{E\,2}$) in the $X_S Y_S$ coordinate system of the third element image $EMM_{23}$ in the additional image 1, using the above described equations (7) and (8). Continuing on, the mask image formation section 32 calculates a magnification $M_{23}$ for expansion or contraction of the second element image $EMM_{23}$ from the following equation (11).

$$M_{23} = R_{23} * LX_W/LX_{E\,23} \quad (11)$$

Next, similarly to the case of the first element image $EMM_{21}$ described above, the mask image formation section 32 carries out expansion or contraction of the element image $EMM_{23}$ with a magnification $M_{23}$ and with origin $O_E$ as a center in the $X_E Y_E$ coordinate system. Continuing on, the mask image formation section 32 rotates the expanded or contracted element image $EMM_{23}$ by angle $\theta_W$ with origin $O_E$ as a center in the $X_S Y_S$ coordinate system. The element image $EMM_{23}$ that has been expanded or contracted and rotated is then arranged in the $X_S Y_S$ coordinate system so that a coordinate position ($X_{E\,2}$, $Y_{E\,2}$) in the $X_S Y_S$ coordinate system becomes the position of the origin $O_E$.

The result of the above processing is that a mask image $MMM_{23}$ such as is shown by image F15C in FIG. 15 is formed. The mask image formation section 32 then notifies data of the mask image $MMM_{23}$ to the composite image formation section 33 as mask image data MMD.

The composite image formation section 33 that has received this mask image data MMD and the original image data OMD forms a composite image $SMM_{23}$ having the mask image $MMM_{23}$ superimposed on the original image. OMM. The composite image $SMM_{23}$ formed in this way is represented as image F16C in FIG. 16.

After that, during time $T_{23}$, the mask image formation section 32 forms the mask image displaying element image $EMM_{23}$ in a size of proportion $R_{23}$ with respect to length value $LX_W$ representing the size of the noted image WMM, with mouth position in the noted image WMM as display position. As a result, during time $T_{23}$ the composite image formation section 33 forms the composite image having the mask image that is the element image $EMM_{23}$ that has been expanded or contracted at magnification $M_{23}$ at the position of the mouth in the noted image WMM of the original image.

In this manner, once time T23 has elapsed, the mask image formation section 32, similarly to above, repeatedly forms the mask image that uses the above described element image $EMM_{21}$, the mask image that uses the element image $EMM_{22}$, and the mask image that uses the element image $EMM_{23}$, in time sequence. The composite image formation section 33 then sequentially forms composite images with mask images comprised of the element image EMM21, element image EMM22 and element image EMM23 that have been expanded or contracted to a designated size superimposed at a position of a mouth of the noted image in the original image, based on original image data OMD and mask image data MMD.

The composite image data SMD formed in the above mentioned manner is reported from the composite image formation section 33 to the basic control section 29. The basic control section 29, which received the composite image data SMD, displays the composite image SMM(D) on the display section or transmits the composite image SMM(D) via transmission section 22 according to the instruction by the user via the operation section 22.

<<Object Outputting Example by Pressing of "3" Key>>

Next, an object outputting example by pressing of "3" key will be described. This example corresponds to the mask image designation of FIG. 10 described above, and is an example of a composite image that displays a mask image, in which an additional image 1 that is displayed in a steady manner at a display position corresponding to an element image and a noted image, and an additional image 2 that is displayed at a display position that changes with time corresponding to an element image and a noted image, are displayed simultaneously, superimposed on an original image.

Figure 17A:
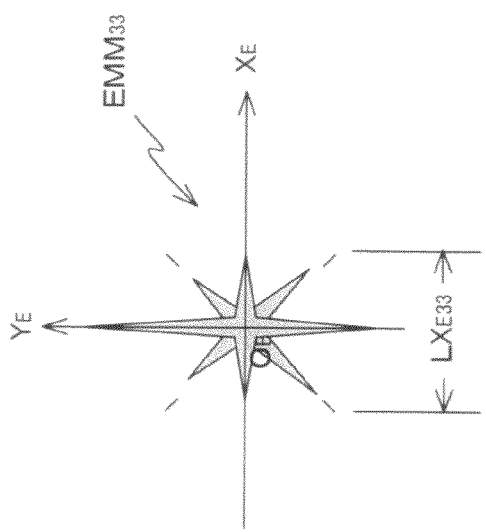
FIG. 17A is a fifth drawing showing an example of an element image.
Figure 17B:
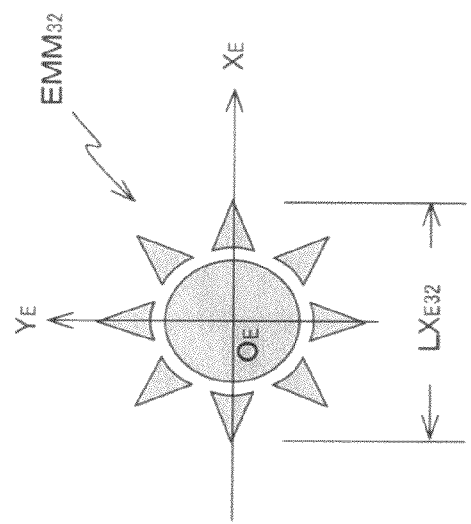
FIG. 17B is a sixth drawing showing an example of an element image.
Figure 17C:
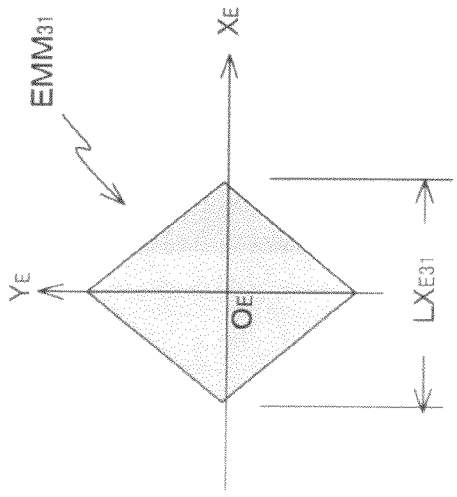
FIG. 17C is a seventh drawing showing an example of an element image.

In this matter, the element image $EMM_{31}$ for the additional image 1 is shown in FIG. 17A. Also, the first element image $EMM_{32}$ for the additional image 2 is shown in FIG. 17B, and the second element image $EMM_{33}$ for the additional image 2 is shown in FIG. 17C.

Note that, element images $EMM_{31}$, $EMM_{32}$ and $EMM_{33}$ are displayed in a size corresponding to "size information" being designated by the descriptor of FIG. 10. Specifically, element image $EMM_{31}$ is displayed in a size of proportion $R_{31}$ with respect to length value $LX_W$ representing size of the noted image WMM. Also, element image $EMM_{32}$ is displayed in a size of proportion $R_{32}$ with respect to length value $LX_W$. Further, element image $EMM_{33}$ is displayed in a size of proportion $R_{33}$ with respect to length value $LX_W$ representing size of the noted image WMM.

When "3" key is pressed by the user, similarly to the press of the "1" or "2" key, the basic control section 29 recognizes the press of any one of the numerical keys and reports key input data to the mask image formation section 32 and the sound data notification section 35. The sound data notification section 35 does not perform action for object outputting and waits the next key input data, because the object assigned to the "3" key is the mask image as above mentioned. On the other hand, the mask image formation section 32 refers the object registration table 49 and reads out the contents of the mask image information file $47_3$.

Similarly to the press of the "1" or "2" key described above, the noted image information extraction section 31 notifies position $(X_{S\ W}, Y_{S\ W})$ as position information for the noted image region, angle $\theta_W$ as inclination information for the noted image region, and length $LX_W$ as size information of the noted image region to the mask image formation section 32 as noted image information data WMD. The mask image formation section 32 that has received the noted image information data WMD first of all calculates display position $(X_{E\ 3\ 1}, Y_{E\ 3\ 1})$ in the $X_S Y_S$ coordinate system of the first element image $EMM_{31}$ in the additional image 1, using the following equations (12) and (13).

$$X_{E\ 3\ 1} = (LX_W/LX_0)(X_{W\ 3\ 1}*\cos\theta_W + Y_{W\ 3\ 1}*\sin\theta_W) + X_{S\ W} \quad (12)$$

$$Y_{E\ 3\ 1} = (LX_W/LX_0)(-X_{W\ 3\ 1}*\sin\theta_W + Y_{W\ 3\ 1}*\cos\theta_W) + Y_{S\ W} \quad (13)$$

Next the mask image formation section 32 calculates a magnification $M_{31}$ for expansion or contraction of the first element image $EMM_{31}$ from the following equation (14).

$$M_{3\ 1} = R_{3\ 1}*LX_W/LX_{E\ 3\ 1} \quad (14)$$

Next, similarly to the press of the "1" or "2" key described above, the mask image formation section 32 carries out expansion or contraction of the element image $EMM_{31}$ with a magnification $M_{31}$ and with origin $O_E$ as a center in the $X_E Y_E$ coordinate system. Continuing on, the mask image formation section 32 rotates the expanded or contracted element image $EMM_{31}$ by angle $\theta_W$ with origin $O_E$ as a center in the $X_S Y_S$ coordinate system. The element image $EMM_{31}$ that has been expanded or contracted and rotated is then arranged in the $X_S Y_S$ coordinate system so that a coordinate position $(X_{E\ 3\ 1}, Y_{E\ 3\ 1})$ in the $X_S Y_S$ coordinate system becomes the position of the origin $O_E$.

Next, similarly to the case for the first element image $EMM_{31}$ of the additional image 1, the mask image formation section 32 calculates display position $(X_{E\ 3\ 2}, Y_{E\ 3\ 2})$ in the $X_S Y_S$ coordinate system of the second element image $EMM_{32}$ in the additional image 2, using the following equations (15) and (16).

$$X_{E\ 3\ 2} = (LX_W/LX_0)(X_{W\ 3\ 2}*\cos\theta_W + Y_{W\ 3\ 2}*\sin\theta_W) + X_{S\ W} \quad (15)$$

$$Y_{E\ 3\ 2} = (LX_W/LX_0)(-X_{W\ 3\ 2}*\sin\theta_W + Y_{W\ 3\ 2}*\cos\theta_W) + Y_{S\ W} \quad (16)$$

Next the mask image formation section 32 calculates a magnification $M_{32}$ for expansion or contraction of the second element image $EMM_{32}$ from the following equation (17).

$$M_{3\ 2} = R_{3\ 2}*LX_W/LX_{E\ 3\ 2} \quad (17)$$

Next, similarly to the case of the element image $EMM_{31}$ described above, the mask image formation section 32 carries out expansion or contraction of the element image $EMM_{32}$ with a magnification $M_{32}$ and with origin $O_E$ as a center in the $X_E Y_E$ coordinate system. Continuing on, the mask image formation section 32 rotates the expanded or contracted element image $EMM_{32}$ by angle $\theta_W$ with origin $O_E$ as a center in the $X_S Y_S$ coordinate system. The element image $EMM_{31}$ that has been expanded or contracted and rotated is then arranged in the $X_S Y_S$ coordinate system so that a coordinate position $(X_{E\ 3\ 2}, Y_{E\ 3\ 2})$ in the $X_S Y_S$ coordinate system becomes the position of the origin $O_E$.

Figure 18:
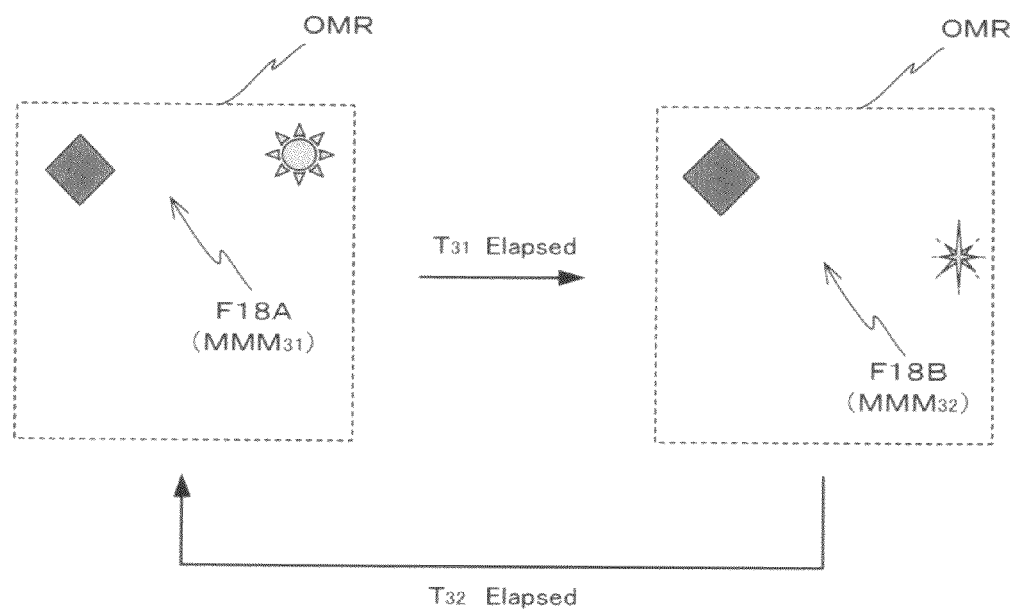
FIG. 18 is a drawing showing an example of a mask image corresponding to FIG. 10.
Figure 19:
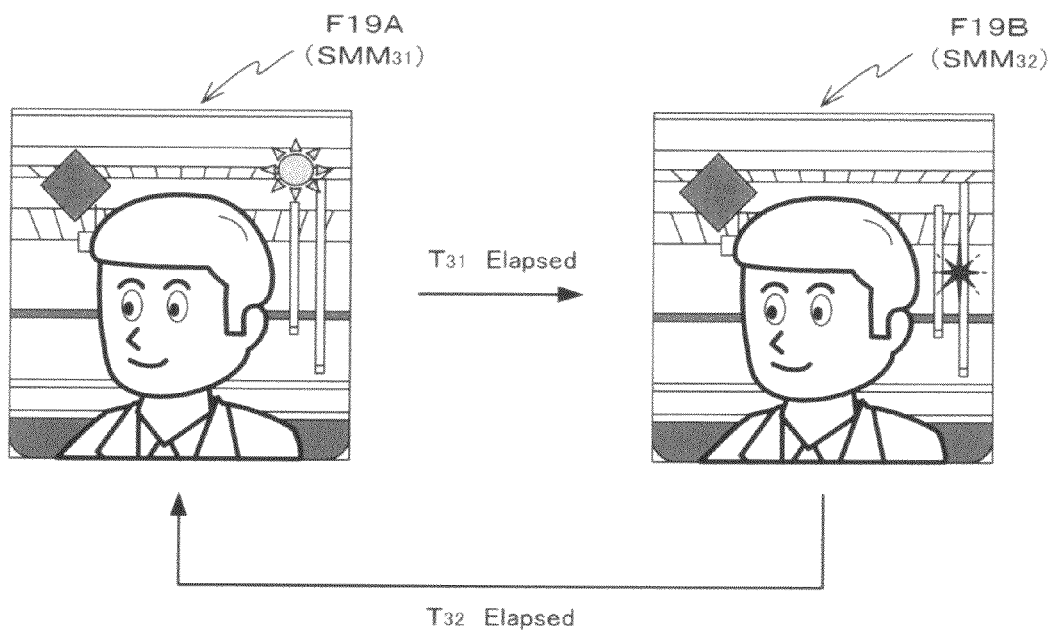
FIG. 19 is a third drawing showing an example of a composite image of the first embodiment.

The result of the above processing is that a mask image $MMM_{31}$ such as is shown by image F18A in FIG. 18 is formed. The mask image formation section 32 then notifies data of the mask image $MMM_{31}$ to the composite image formation section 33 as mask image data MMD.

The composite image formation section 33 that has received this mask image data MMD and the original image data OMD forms a composite image $SMM_{31}$ having the mask image $MMM_{31}$ superimposed on the original image OMM. The composite image $SMM_{31}$ formed in this way is represented as image F19A in FIG. 19.

After that, during time $T_{31}$, the mask image formation section 32 forms the mask image displaying element image $EMM_{31}$ in a size of proportion $R_{31}$ with respect to length value $LX_W$ representing the size of the noted image WMM, and displaying element image $EMM_{32}$ in a size of proportion $R_{32}$ with respect to length value $LX_W$, at a position that has a designating relationship to the noted image WMM. During time $T_{31}$, the composite image formation section 33 then forms a composite image having the mask image represented by mask image data MMD notified from the mask image formation section 32 superimposed on the original image.

In this manner, once time $T_{31}$ has elapsed, the mask image formation section 32 calculates display position ($X_{E\ 3\ 1}$, $Y_{E\ 3\ 1}$) in the $X_S Y_S$ coordinate system, and magnification $M_{31}$, of the first element image $EMM_{31}$ in the additional image 1, using the above described equations (12) to (14). Then, after expanding or contracting element image $EMM_{31}$ with a magnification $M_{31}$, the mask image formation section 32 then rotates by angle $\theta_W$ with origin $O_E$ as a center in the $X_E Y_E$ coordinate system. The element image $EMM_2$ that has been expanded or contracted and rotated is then arranged in the $X_S Y_S$ coordinate system so that a coordinate position ($X_{E\ 3\ 1}$, $Y_{E\ 3\ 1}$) in the $X_S Y_S$ coordinate system becomes the position of the origin $O_E$.

Next, similarly to the case for the first element image $EMM_{11}$ of the additional image 1, the mask image formation section 32 calculates display position ($X_{E\ 3\ 3}$, $Y_{E\ 3\ 3}$) in the $X_S Y_S$ coordinate system of the element image $EMM_{33}$ in the additional image 2, using the following equations (18) and (19).

$$X_{E\ 3\ 3} = (LX_W/LX_0)(X_{W\ 3\ 3} * \cos\theta_W + Y_{W\ 3\ 3} * \sin\theta) + X_{S\ W} \quad (18)$$

$$Y_{E\ 3\ 3} = (LX_W/LX_0)(-X_{W\ 3\ 3} * \sin\theta_W + Y_{W\ 3\ 3} * \cos\theta) + Y_{S\ W} \quad (19)$$

Next the mask image formation section 32 calculates a magnification $M_{33}$ for expansion or contraction of the third element image $EMM_{33}$ from the following equation (20).

$$M_{33} = R_{33} * LX_W/LX_{E\ 3\ 3} \quad (20)$$

Next, similarly to the case of the first element image $EMM_{31}$ described above, the mask image formation section 32 carries out expansion or contraction of the element image $EMM_{33}$ with a magnification $M_{33}$ and with origin $O_E$ as a center in the $X_E Y_E$ coordinate system. Continuing on, the mask image formation section 32 rotates the expanded or contracted element image $EMM_{33}$ by angle $\theta_W$ with origin $O_E$ as a center in the $X_S Y_S$ coordinate system. The element image $EMM_{33}$ that has been expanded or contracted and rotated is then arranged in the $X_S Y_S$ coordinate system so that a coordinate position ($X_{E\ 3\ 3}$, $Y_{E\ 3\ 3}$) in the $X_S Y_S$ coordinate system becomes the position of the origin $O_E$.

Figure 16:
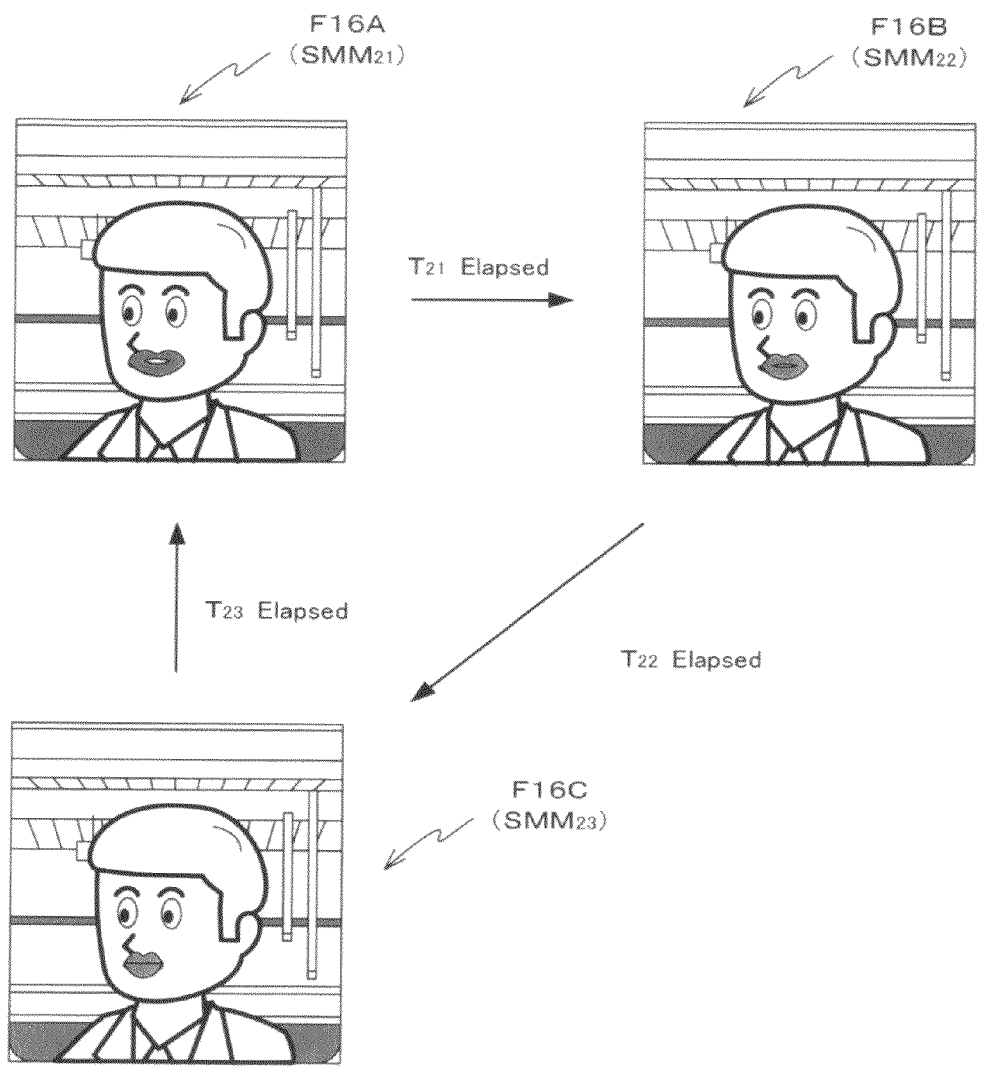
FIG. 16 is a second drawing showing an example of a composite image of the first embodiment.

The result of the above processing is that a mask image $MMM_{32}$ such as is shown by image F16B in FIG. 16 is formed. The mask image formation section 32 then notifies data of the mask image $MMM_{32}$ to the composite image formation section 33 as mask image data MMD.

The composite image formation section 33 that has received this mask image data MMD and the original image data OMD forms a composite image $SMM_{32}$ having the mask image $MMM_{32}$ superimposed on the original image OMM. The composite image $SMM_{32}$ formed in this way is represented as image F19B in FIG. 19.

After that, during time $T_{32}$, the mask image formation section 32 forms the mask image displaying element image $EMM_{31}$ in a size of proportion $R_{31}$ with respect to length value $LX_W$ representing the size of the noted image WMM, and displaying element image $EMM_{33}$ in a size of proportion $R_{33}$ with respect to length value $LX_W$, at a position that has a designating relationship to the noted image WMM. During time $T_{32}$, the composite image formation section 33 then forms a composite image having the mask image represented by mask image data MMD notified from the mask image formation section 32 superimposed on the original image.

In this manner, once time $T_{32}$ has elapsed, the mask image formation section 32, similarly to above, repeatedly forms the mask image that uses the above described element image $EMM_{31}$ and the element image $EMM_{32}$, and the mask image that uses the element image $EMM_{31}$ and the element image $EMM_{33}$, in time sequence. The composite image formation section 33 then sequentially forms composite images having the mask images represented by mask image data MMD notified from the mask image formation section 32 superimposed on the original image.

The composite image data SMD formed in the above mentioned manner is reported from the composite image formation section 33 of the basic control section 29. The basic control section 29, which received the composite image data SMD, displays the composite image SMM(D) on the display section or transmits the composite image SMM(D) via transmission section 22 according to the instruction by the user via the operation section 22.

<<Object Outputting Example by Pressing of "4" Key>>

Next, an object outputting example by pressing of "4" key will be described. This example is an example of reproducing and outputting the sound based on the sound data stored in the sound data file $48_1$.

When "4" key is pressed by the user, the basic control section 29 recognizes the press of any one of the numerical keys and reports key input data to the mask image formation section 32 and the sound data notification section 35. The mask image formation section 32, which received the key input data refers the object registration table 49 and decides whether the mask image object assigned to the "4" key is exist or not. In here, because the object assigned to the "4" key is the sound object as above mentioned, the mask image formation section 32 decides that the mask image assigned to the "4" key is not exist. As a result, the mask image formation section 32 does not perform operation for object outputting and waits the next key input data. Therefore, the original image data OMD is only notified of the composite image formation section 33, and the output data SMD from the composite image formation section 33 is the original image data OMD.

On the other hand, the sound data notification section 35, which received the key input data, refers the object registration table 49 and decides whether the sound data assigned to the "4" key is exist or not. As a result of this decision is affirmative; the sound data notification section 35 reads out the contents of the mask image information file $48_1$, and sends the data read out of the basic control section 29 as the sound data SSD.

The basic control section 29, which is received the data form the composite image formation section 33 and the sound data notification section 35 as described above, displays the original image OMM on the display section 13, and reproduces and outputs the sound from the call speaker 14 or the guidance speaker 16 based on the sound data SSD.

As has been described above, with this embodiment, the operated key is identified in the mask image formation section 32 and the sound data notification section 35 when the user operates one of the numerical key in the operating section 35 for outputting the object and displaying the image included in the original image OMM on the display section 13 simultaneously. Next, it is decided whether object assigned to the identified key is exist or not. Then the outputting of the object corresponding to the operation of the identified key and displaying the image included in the original image OMM on the display section 13 are performed simultaneously when the result of the decision is affirmative. Therefore, according to this embodiment, it is possible to increase the convenience of the user because it is possible to switch the object, which is simultaneously output with displaying the image included in the original image OMM, by one button control.

Also, when the object, which is output simultaneously with displaying the image included in the original image OMM, a region of a noted image WMM is specified in an original image, and noted image information WMD containing information relating to position and size of the noted image WMM region within the original image is extracted. Continuing on, a mask image MMM displayed superimposed on the original image OMM is formed based on noted image information WMD and mask image information registered in the mask image information file 40. As a result, a mask image comprised of element images selected using element image selection information contained in mask image information is formed on the original image OMM at a position determined using information connected to position of a region of noted image WMM and information representing a relationship to position of the noted image region contained in mask image information, and at a size determined by information relating to size of the region of the noted image WMM in the original image OMM, and information representing a relationship to size of the noted image region. A composite image having the mask image superimposed on the original image is then formed. Therefore, according to this embodiment, it is possible to simply and appropriately form an image that a user has rendered on original image according to their interests.

Also, it is possible for the information relating to the position of the noted image region contained in the mask image information to contain position information for a representative point of the noted image region WMR in the original image OMM. Therefore, it is possible to make information representing a relationship to position of a noted region contained in the mask image information, information representing a relative relationship for a representative point of the noted image, and it is possible to simplify information representing a relationship with position of the noted image region in the relationship information.

Also, it is possible for the information relating to the position of the noted image region contained in the mask image information to further contain inclination information for the noted image region in the original image OMM. Therefore, by using the inclination information for the noted region of the original image OMM it is possible to form a composite image displaying a desired element image superimposed at a position corresponding to the inclination of the noted image region in the original image. It is also possible to display by holding inclination in the displayed element image corresponding to inclination of the noted image region in the original image.

Also, as information relating to position of the noted image contained in the mask image information, a representative point of the noted image is made an origin, and coordinate position information in a coordinate system determining direction of a coordinate axis based on inclination of the noted image region in the original image is included as display position information for an element image. Therefore, the information with respect to a representative point of the noted image region can be simply interpreted as coordinate position information of a coordinate system that determined by direction of coordinate axis based on inclination of the noted image region, wherein the system has an origin as a representative point of the noted image region. Herein, the noted information is the information representing a relative position of information relating to the position.

Also with this embodiment, it is possible for the mask image information to contain proportion information for size of the noted image region and size of the element image EMM at the time of displaying. In this case, even when size of the noted image within the original image OMM is changed from moment to moment, it is possible to form a mask image MMM containing element images EMM of size appropriate to the size of the noted image region.

Also with this embodiment, it is possible for the mask image information to contain execution time information for respective display of the element image EMM. In this case, by forming a mask image WMM according to the execution time information, it is possible to display respective desired element images EMM for only display execution times set to respective to desired times, and it is possible to form a mask image MMM to vary the dynamic.

Also, with this embodiment, it is possible for the mask image information to contain information time sequence display designation, for designating display a plurality of element images EMM in time sequence, and repeat of time sequence display. In this case, by forming a mask image WMM according to the time sequence display designation information, it is possible to display a plurality of element images on the original image OMM repeatedly in time sequence every desired time.

Also, with this embodiment, it is possible for the mask image information to contain information for simultaneous display designation, for designating display of a plurality of element images at the same time. In this case, it is possible to form a mask image having a desired plurality of element images EMM respectively displayed as desired positions, and it is possible to form mask images WMM of numerous variations.

Although the mask image is superimposed on the original image in the first embodiment above mentioned, it is possible to take different images to the original image in the background to the human figure image. This modified example will be described mainly with reference to FIG. 20 to FIG. 27. Note that, elements that are the same or similar to the above described first embodiment have the same reference numbers assigned, and repeat description will be omitted.

Figure 20:
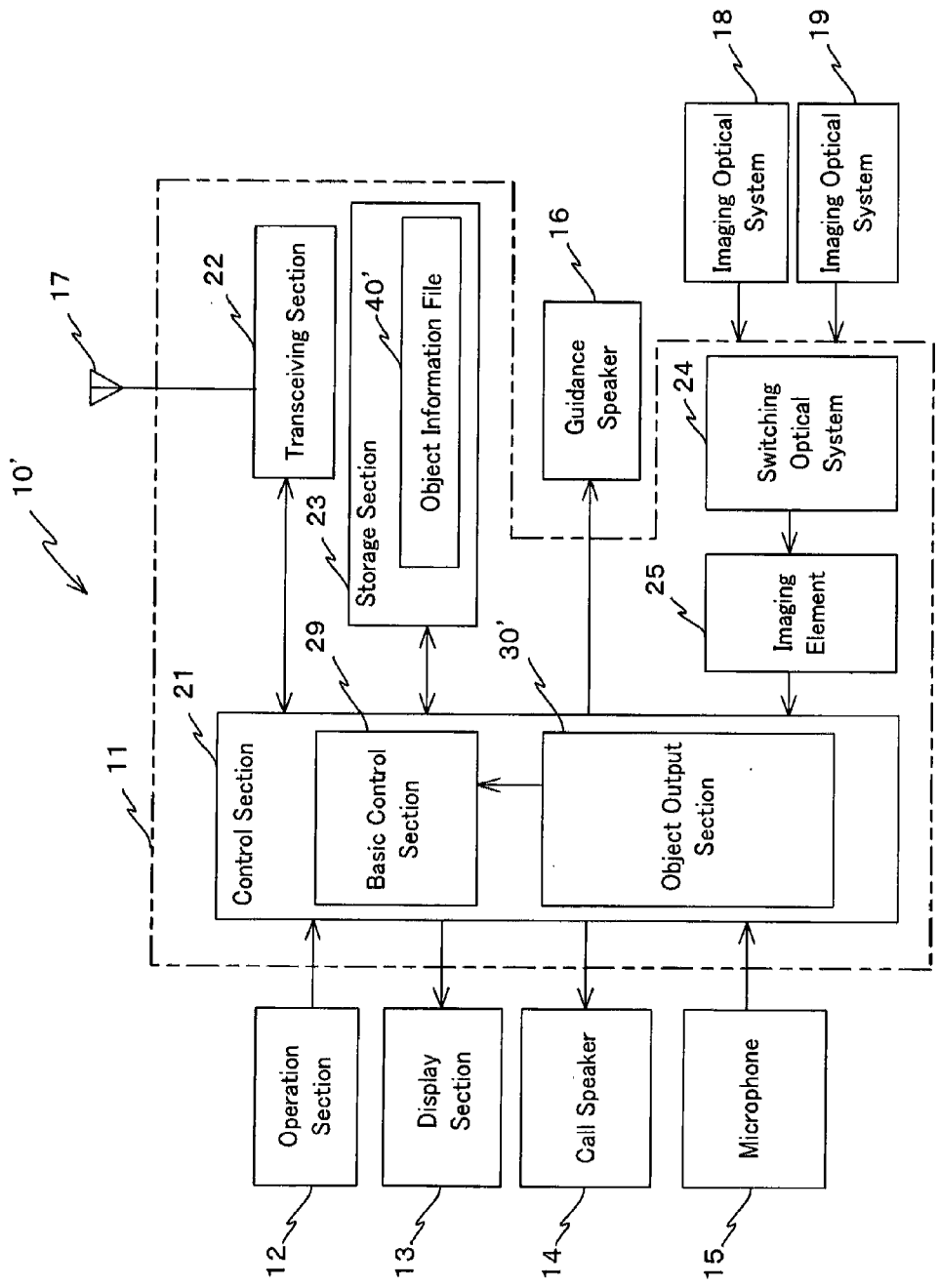
FIG. 20 is functional block diagram for describing the internal configuration of a cellar phone unit of a variation example of the present invention.

Compared to the first embodiment, this variation example is different in that a cellar phone unit 10' of this variation example is different from the cellar phone unit of the first embodiment in that the object output section 30' is provided in the control section 21 and in that the mask image information file 40' is stored in the storage section 23, inside of the cellar phone body 11 as shown in FIG. 20.

Figure 21:
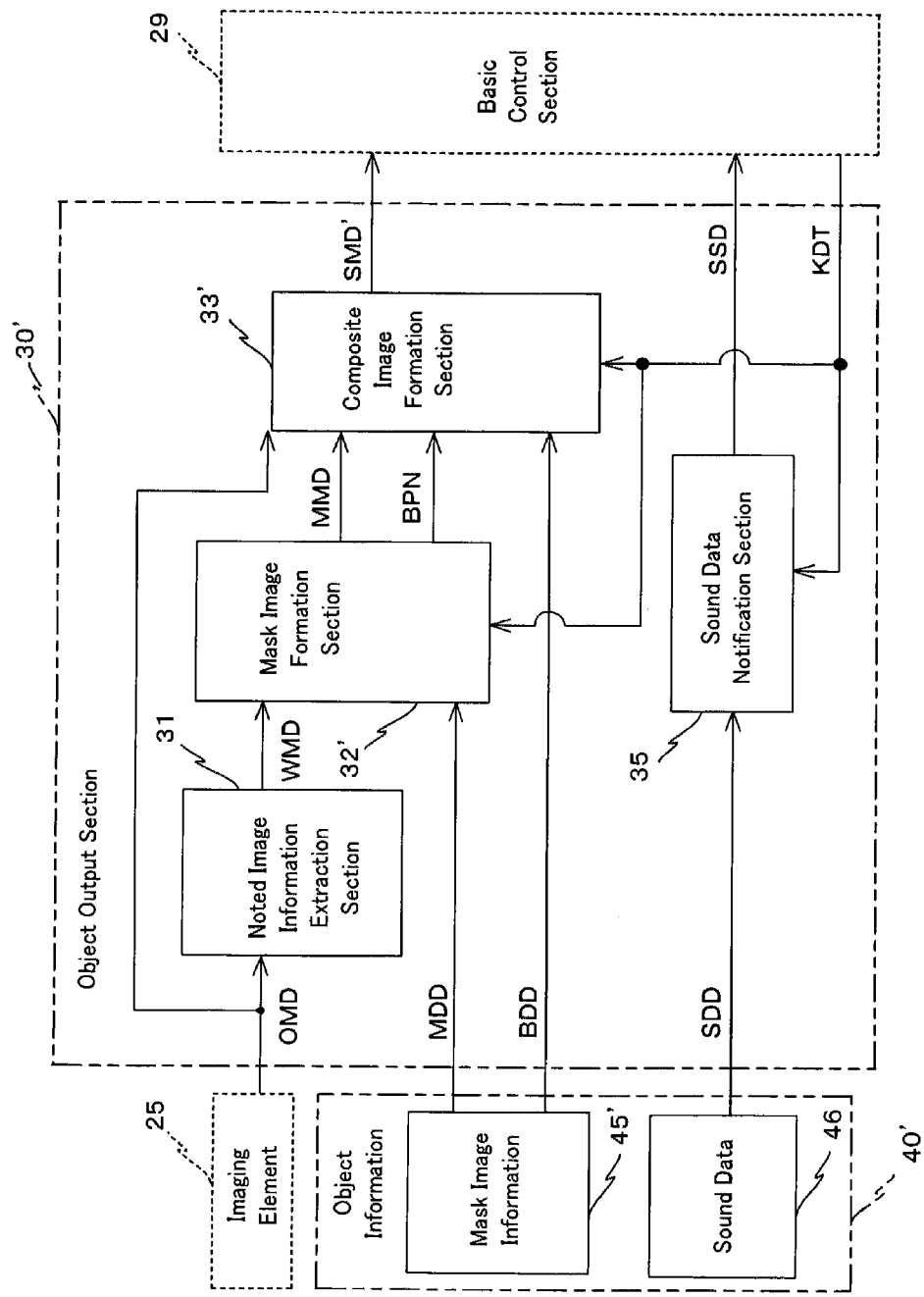
FIG. 21 is functional block diagram for describing the internal configuration of an object output section of FIG. 20.

As shown in FIG. 21, compared to the object output section 30 in the first embodiment, the object output section 30' is different in that the object output section 30' comprises a mask image formation section 32' and a composite image formation section 33' in stead of the mask image formation section 32 and the composite image formation section 33.

As with the mask image formation section 32 of the first embodiment, the mask image formation section 32' forms mask image data MMD based on noted image information WMD extracted by the noted image information extraction section 31, and mask image information MDD stored in the mask image information file 40' in the above mentioned storage section 23. Also, the mask image formation section 32' creates background image information BPN made up of background image designation information representing whether or not there is background image designation and storage position information for the background image data BDD in the background designation information in the event that there is background image designation, based on mask image information MDD.

When the fact that there is background image designation has been notified using the background image information BPN, the composite image formation 33' first of all forms an image that has a person's image, being a specified display image within an original image, superimposed on a background image using the background image data BDD, as a background image containing image, based on original image data OMD and background image data BDD. Continuing on, the composite image formation section 33' forms composite image data SMD', wherein a mask image represented using mask image information MDD is superimposed on the image containing background image.

On the other hand, when the fact that there is no background image designation is notified using the background image information BPN, the composite image formation means 33' forms the original image as a background image containing image. Continuing on, the composite image formation section 33' forms composite image data SMD having a mask image represented using mask image information MMD superimposed on the background image containing image. In this case, the composite image data SMD' is the same as the composite image data SMD of the first embodiment.

The composite image data SMD' formed by the composite image formation section 33 is notified to the basic control section 29.

Figure 22:
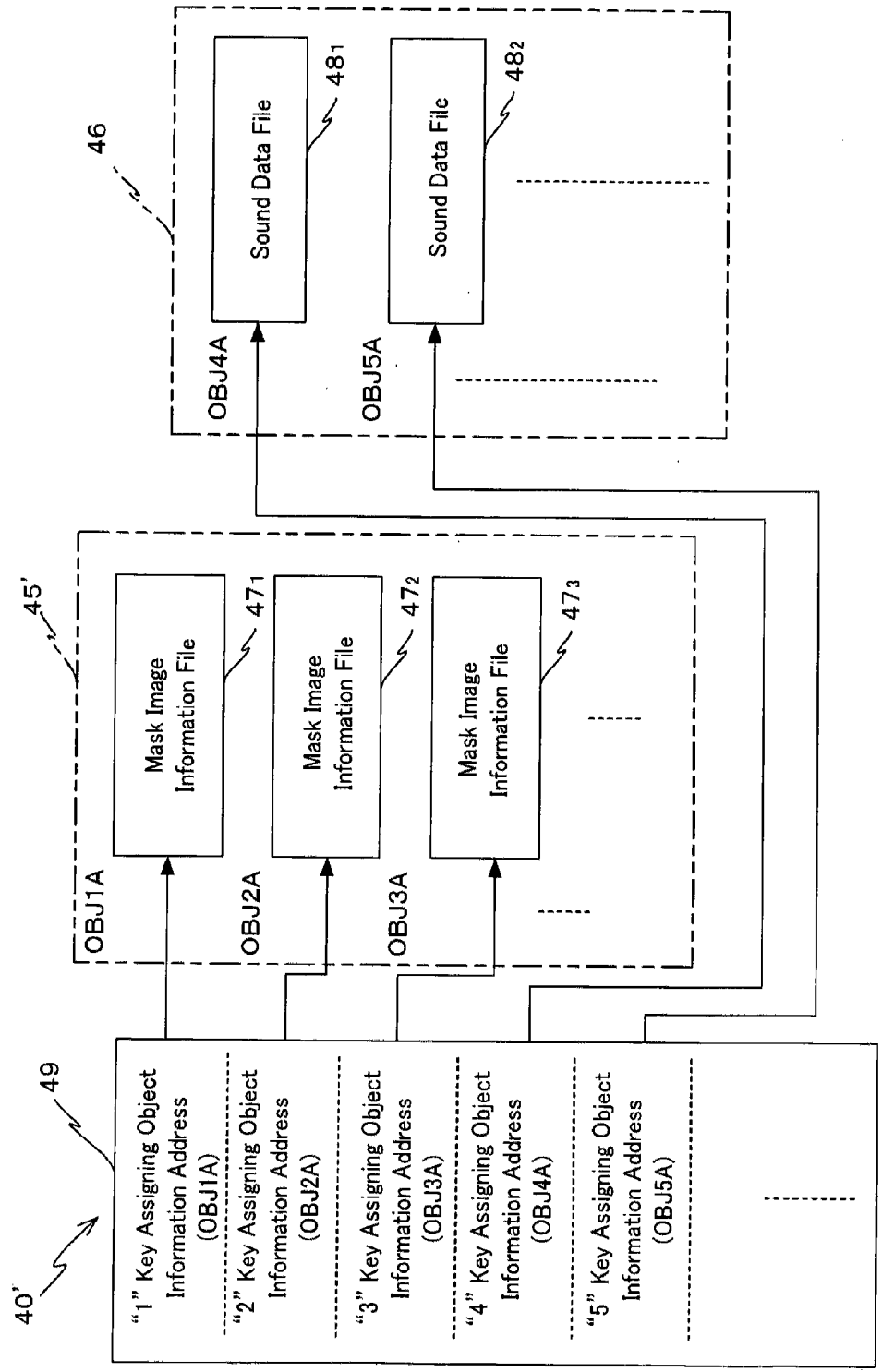
FIG. 22 is functional block diagram for describing the configuration of an object output section of FIG. 20.

As shown in FIG. 22, compared to the object information section 40, there is a difference that the object information section 40' includes a mask image information section 45' instead of the mask image information section 45. Compared to the mask image information section 45, there is a difference that the mask image information section 45' includes a mask image information file $47_1'$ instead of the mask image information file $47_1$.

Figure 23:
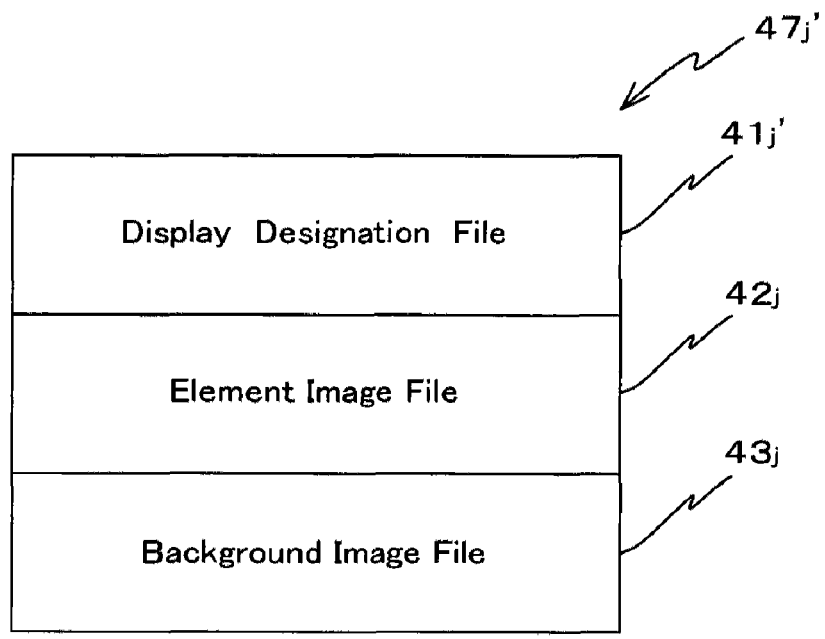
FIG. 23 shows the configuration of the object information in FIG. 22.

As shown in FIG. 23, the mask image information file 47' is comprised of (i) a display designation file 41' storing display designation descriptors for designating as to with what relationship to the noted image region in the original image the mask image is displayed and background image designation descriptors, (ii) the above described element image file 42, and (iii) a background image file 43 storing background image data BDD. Note that, the mask image information file 40' is provided to the cellar phone unit 10 from a contents provider via wireless circuit, or is provided after being formed by the user using a personal computer or the like by means of storage medium or a non-shown external interface.

Figure 25:
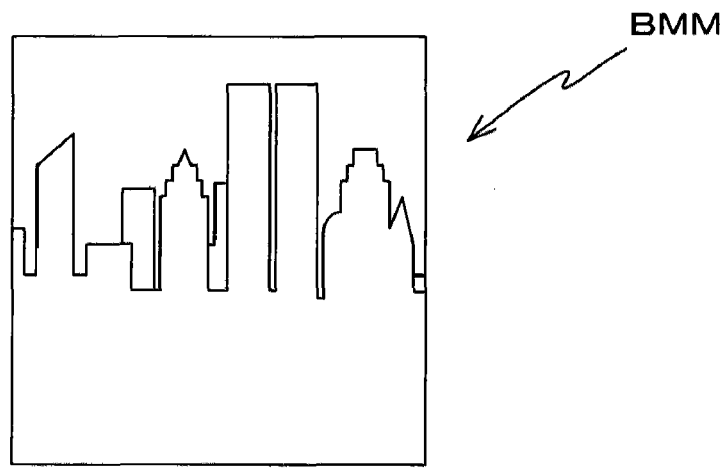
FIG. 25 is a drawing showing an example of a background image.

An example of display designation descriptors for the display designation file 41' of this modified example is shown in FIG. 24. The descriptor example in FIG. 21(24) has the fact that there is background image designation added to the descriptor example of FIG. 8 for the case of the first embodiment. Specifically, with the display designation descriptor of FIG. 21, in addition to the descriptor for additional image 1 and additional image 2 in FIG. 7(8) from <simultaneous display designation> to <end simultaneous display designation>, a background image to be displayed simultaneously using the descriptor "background image designation" from <background image designation> to <end background image designation> is designated. Here, a header address BMMA for the background image file 43 in the storage section 23 is designated as "background image designation". In the following description, background image data BDD representing a background image BMM inside the background image region BMR having the same shape and size as the original image region OMR shown in FIG. 25 is stored in the background image file 43.

Note that, when there is no descriptor from <background image designation> to <end background image designation>, it means that there is no background image designation. Also in the case where "0" is described as the header address BMMA value for the background image file 43, it means that there is no background image designation.

In the following description will be given of the operation of forming a composite image in the cellar phone unit 10' constructed as described above when the "1" key is pressed.

Figure 26:
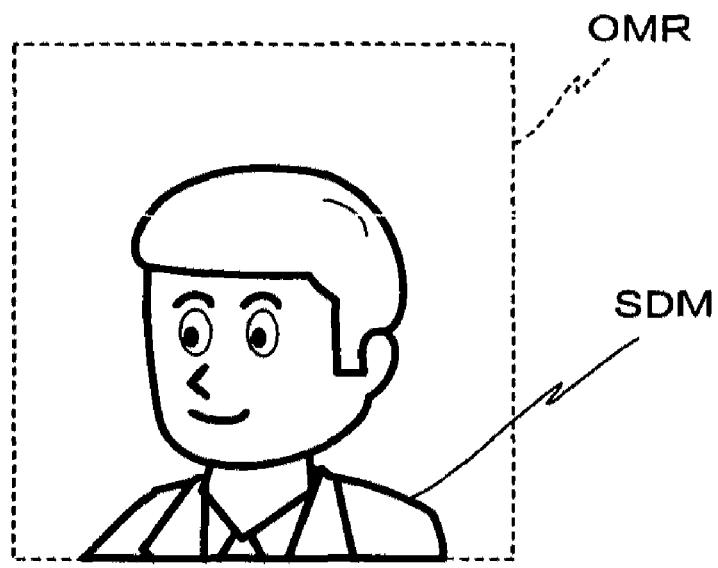
FIG. 26 is a drawing showing an example of a specified display image.

In addition to the prerequisites for the composite image formation operation in the first embodiment described above, the person image SDM inside the original image region OMR shown in FIG. 26 is a specified display image to be cut from the original image OMM.

First of all, similarly to the case of the first composite image forming example of the first embodiment, original image data OMD, being data for an original image OMM imaged on the imaging element 25, is notified to the noted image information extraction section 31, and noted image information data WMD is formed by the noted image information extraction section 31. The noted image data WMD formed in this way is notified from the noted image information extraction section 31 to the mask image formation section 32'.

Similarly to the case of the first composite image formation example for the first embodiment, the mask image formation section 32' that has received the noted image information data WMD creates data of a mask image MMMA based on noted image information data WMD and mask image information MDD, and notifies the data of the composite image formation section 33' as mask image data MMD. Also, the mask image formation section 32' creates background image information BPN comprising whether or not there is background image designation, and a header address of a background image file 43 for when there is background image designation, based on mask image information MDD, and notifies the background image information BPN to the composite image formation section 33'. In this case, as shown in FIG. 24 described above, background image designation is described in the display designation file 41' and so the fact that there is background image designation and a header address of the background image file 43 is included as background image information BPN.

The composite image formation section 33' that has received the mask image data MMD, original image data OMD and background image data BPN first of all determines whether or not there is background image designation based on the background image information BPN. In the present case, since there is background image designation, as described above, the determination result is affirmative. Continuing on, the composite image formation section 33' reads out background image data BDD from the background image file 43 using the header address of the background image file 43 in the background image information.

In this manner, the composite image formation section 33' that has acquired the background image data BDD, in addition to the mask image data MMD and the original image data OMD creates composite image data SMD as follows.

Figure 27:
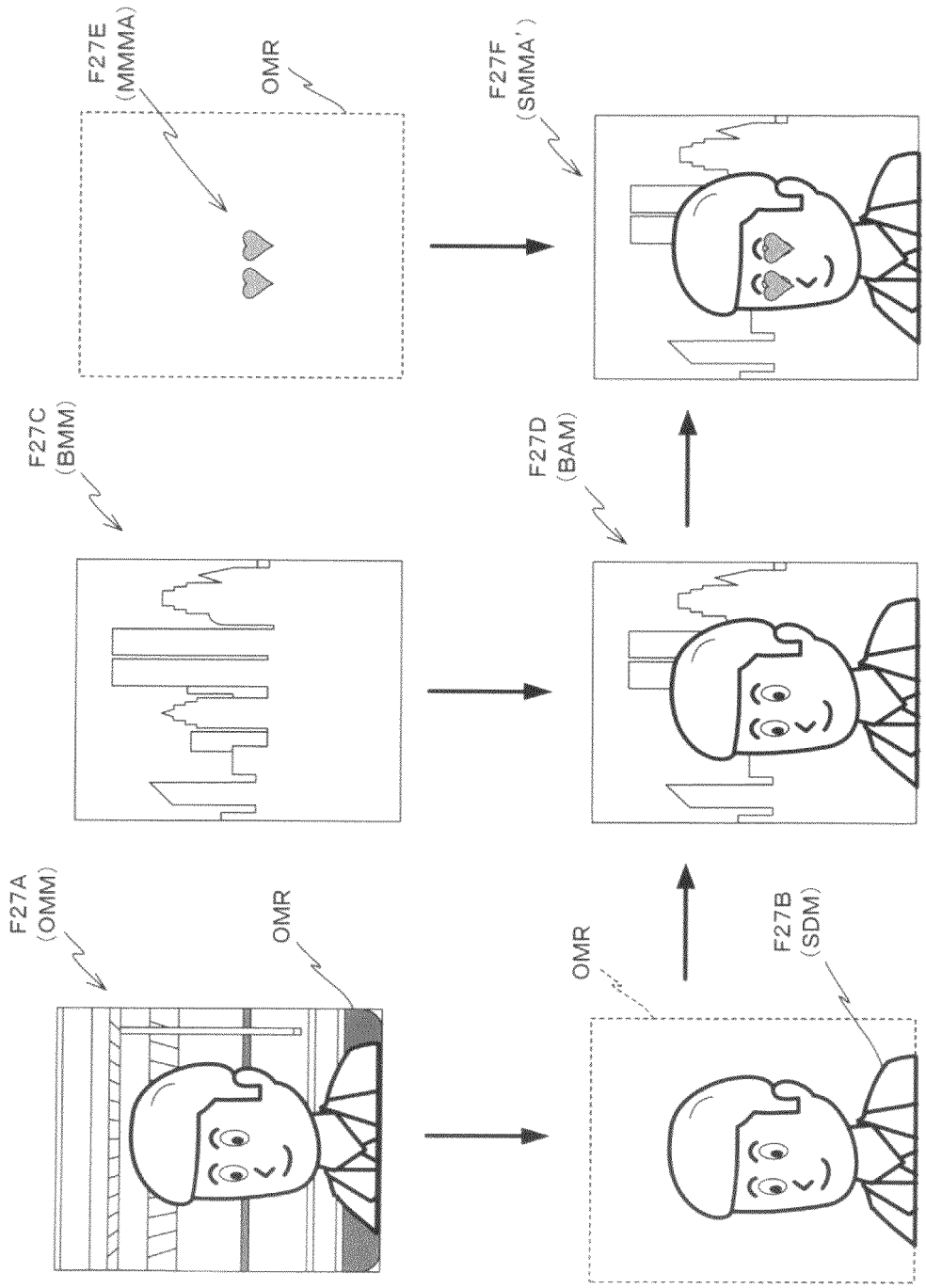
FIG. 27 is a flowchart for explaining a composite image formation procedure for composite image formation section in FIG. 21.

First of all, a personal image SDM is extracted from the original image OMM represented by the image F27A in FIG. 27 as a specified display image represented by the image F27B. This extraction is carried out after specifying the outline of the personal image SDM from general characteristics of a human figure image, by extracting an image inside the outline.

Continuing on, the composite image formation region 33' superimposes the specified display image SDM on the background image BMM represented by image F27C, at the same position and same size as for the case of the original image OMR. As a result, a background additional image BAM represented as image F27D is formed.

Next, the composite image formation section 33' superimposes the mask image MMMA represented as the image F27E on the background additional image BAM. As a result, a composite image SMMA' represented as image F27F is formed.

The data SMD' of the composite image SMMA' formed in this manner is notified from the composite image formation section 33 to the basic control section 29. In accordance with designation carried out by a predetermined user operating the operation section 12, the basic control section 29 that has received this composite image information data displays the composite image SMMA' on the display section 13, and transmits to a fellow caller via the transceiver section 21.

Note that, in a case where background image designation is not described in the display designation file 41', or when the storage header address of the background image data BDD is "0", the mask image formation section 32' forms background image information BPN comprising only the fact that there is no background image designation and notifies this data to the composite image formation section 33'. The composite image formation section 33' that receives this type of background image information BPN determines that there is no background image designation and superimposes the mask image MMMA on the original image OMM to form a composite image. As a result, a composite image SMMA that is the same as for the case of the composite image formation example of the first embodiment is formed.

Also, with the above description when mask image designation is not described in the display designation file 41' but only background image designation is described, a background additional image BAM is formed in the composite image formation section 33' as a completed composite image.

Also, with the above description, description has been given of an example with background image designation in addition to mask image designation that is the same as for the case of the first composite image formation example for the first embodiment when the "1" key is pressed. However, naturally it is also possible to have background image designation in addition to mask image designation that is the same as the second and third composite image designation examples of the first embodiment when the "2" or "3" key.

<Second Embodiment>

Next, a second embodiment of the present invention will be described mainly with reference to FIG. 28 to FIG. 32. Note that, elements that are the same or similar to the above described first embodiment have the same reference numerals assigned, and repeat description will be omitted.

Figure 28:
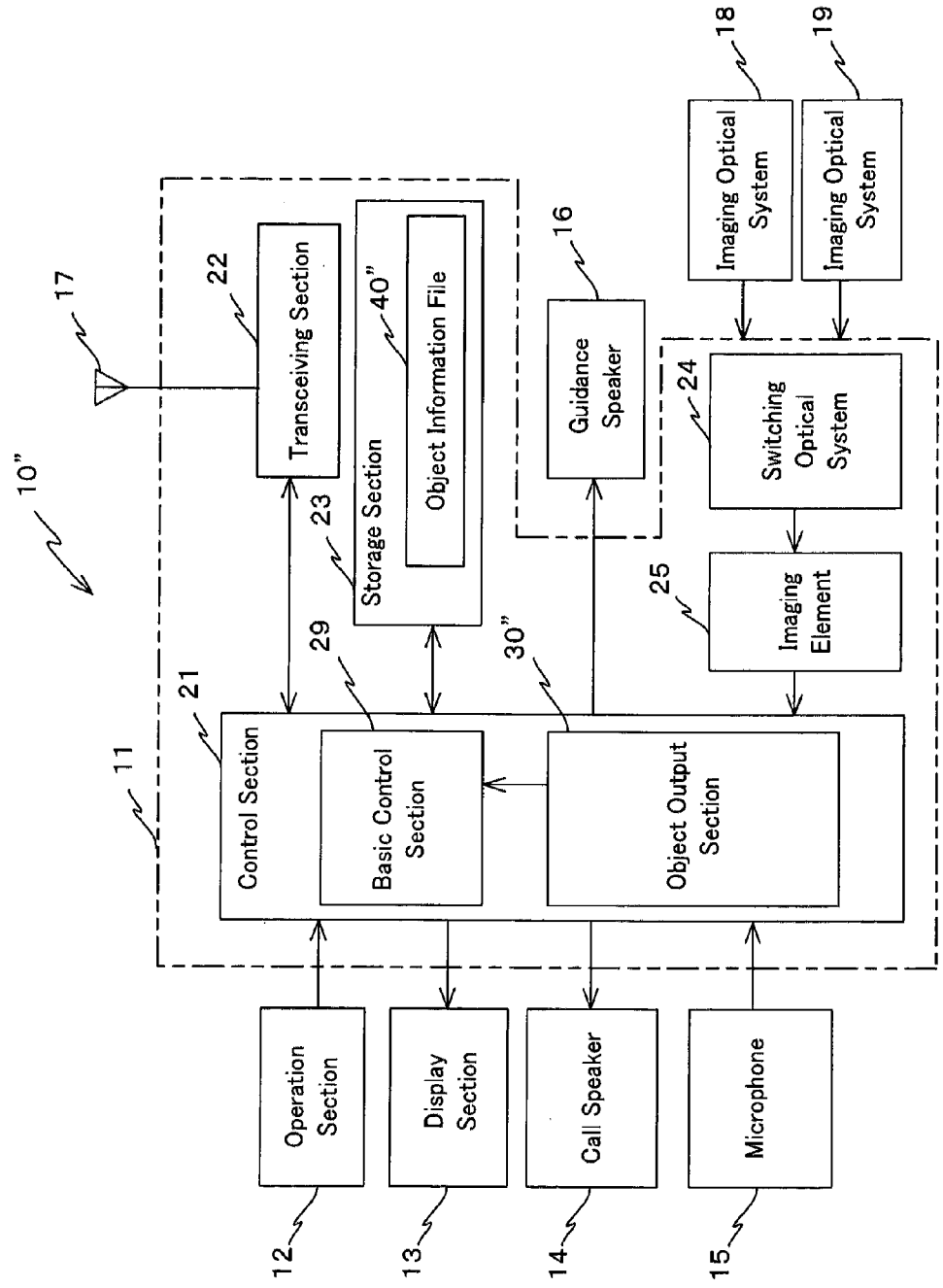
FIG. 28 is a functional block diagram for describing the internal structure of a cellar phone unit of a second embodiment of the present invention.

As shown in FIG. 28, a cellar phone unit 10" of this second embodiment is different from the cellar phone unit 10 of the first embodiment in that an object output section 30" is provided in the control section 21 in stead of the object output section 30 and in that a mask image information file 40" is stored in the storage section 23 in stead of the mask image information file 40", inside of the cellar phone body 11.

Figure 29:
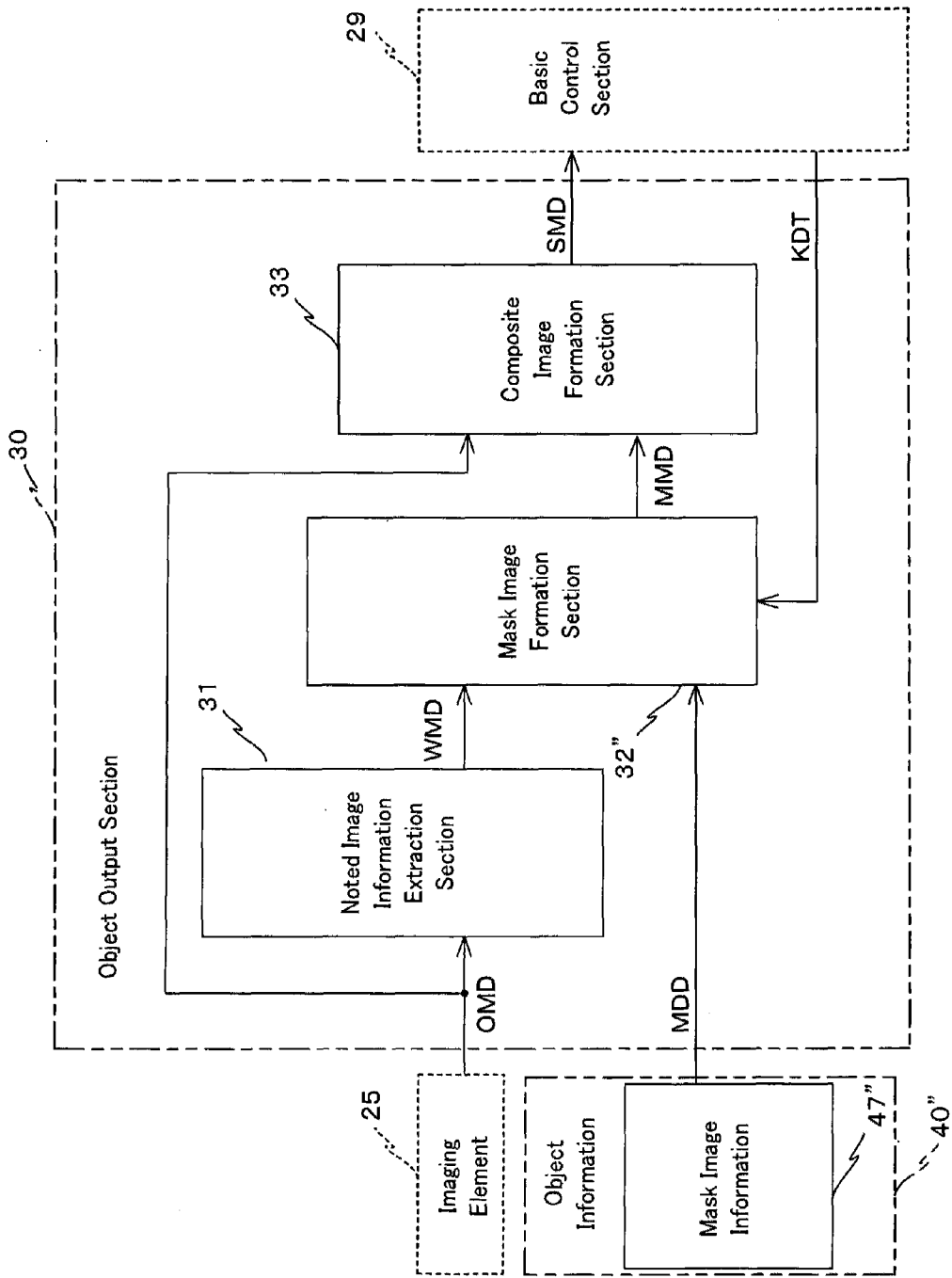
FIG. 29 is a functional block diagram for describing the internal structure of an object output section of FIG. 28.

As shown in FIG. 29, compared to the object output section 30 in the first embodiment, there is a difference that the object output 30" comprises a mask image formation section 32" in stead of the mask image formation section 32 and dose not comprise the sound data notification section 35.

As with the mask image formation section 32 of the first embodiment, the mask image formation section 32" forms mask image data MMD based on noted image information WMD extracted by the noted image information extraction section 31, and mask image information MDD stored in the mask image information file 40". Also, the mask image formation section 32" creates update-image based on the noted image information WMD and the mask image data MMD when the key input data KDT notified from the basic control section 29 is corresponding to the press of a mask image update key. Then the mask image formation section 32" sends the data of initial mask image or update mask image as the mask image data to the composite image formation section 33. Note that the formation of the original image file or updated image file is described later.

Figure 30:
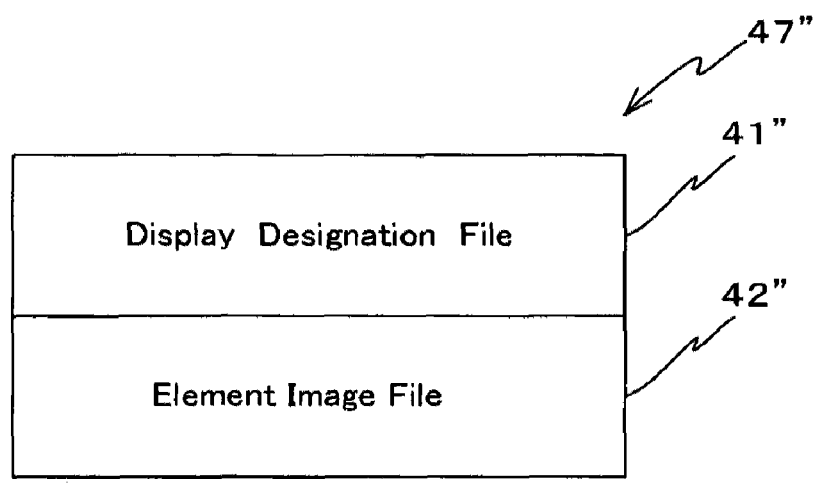
FIG. 30 is a drawing for describing the mask image information file structure of FIG. 29.

The object information section 40" includes a mask information file 47". As shown in FIG. 30, the mask information file 47" is comprised of (i) a display designation file 41" storing display designation descriptors for designating as to with what relationship to the noted image region in the original image the mask image is displayed, and (ii) an element image file 42" storing the element image data designated using display designation descriptors in the display designation file 41". Note that, the mask image information file 47" is provided to the cellar phone unit 10 from a contents server via a wireless circuit, or is provided after being formed by the user using a personal computer or the like by means of storage medium or an external interface, not shown in this figure.

Figure 31:
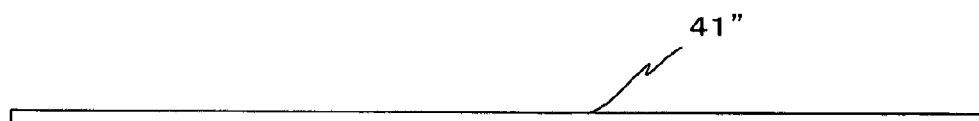
FIG. 31 is a drawing showing example contents of the display designation file of FIG. 30.

An example of display designation descriptors for the display designation file 41" of this embodiment is shown in FIG. 31. The descriptor example in FIG. 31 is that the display time designation of each element image in the <additional image 2 designation> of the description example shown by FIG. 10 in the first embodiment is removed. That is, by using the description example shown by FIG. 31, the simultaneous display of the additional image 1 and the additional image 2, which are designated by the <additional image 1 designation> and <additional image 2 designation> between the <simultaneous display designation> and <end simultaneous display designation>, is designated.

The additional image 1 is designated by using the descriptors between <additional image 1 designation> and <end additional image 1 designation>. This designation is similar to the case of FIG. 10. Also, the display designation of the first element (hereinafter "the first display designation") and the display designation of the second element (hereinafter "the second display designation") is performed by using the descriptors between <additional image 2 designation> and <end additional image 2 designation> for the additional image 2.

In the first display designation of the additional image 2 designation, it is designated to display the element image $EMM_{32}$ designated by an "element image designation" at a coordinate position $(X_{W32}, Y_{W32})$ of the $X_W Y_W$ coordinate system designated by the display position designation. Also, it is designated that a maximum width in a $X_W$ axis direction of the element image $EMM_{32}$ at the time of display is shown as a length of proportion $R_{32}$ with respect to the size of $LX_W$ of the noted image region WMR as designated by "size designation".

In the second display designation of the additional image 2 designation, it is designated to display the element image $EMM_{33}$ designated by an "element image designation" at a coordinate position $(X_{W\,3\,3}, Y_{W\,3\,3})$ of the $X_W Y_W$ coordinate system designated by the display position designation. Also, it is designated that a maximum width in a $X_W$ axis direction of the element image $EMM_{33}$ at the time of display is shown as the length of proportion $R_{33}$ with respect to size $LX_W$ of the noted image region WMR as designated by "size designation".

In the case of the above mentioned description example shown in FIG. 31, the mask image formation section 32" firstly forms the image for simultaneously displaying the element image $EMM_{31}$ and the element image $EMM_{32}$ as the initial mask image. Continuously, the mask image formation section 32" forms the image for simultaneously displaying the element image $EMM_{31}$ and the element image $EMM_{33}$ as the update mask image, when the mask image formation section 32" receives the notification that the image update key in the operating section 12 is pressed by the user. After that, the mask image formation section 32" forms the image for simultaneously displaying the element image $EMM_{31}$ and the element image $EMM_{32}$, which is the same image as the initial mask image, as the update mask image, when the mask image formation section 32" receives further the notification that the image update key in the operating section 12 is pressed by the user. Afterward, every reception of the notification that the image update key in the operating section 12 is pressed by the user, the mask image formation section 32" forms the followed update mask image to be displayed.

In the following description will be given of the operation of forming a composite image, in the cellar phone unit constructed as described above.

In addition to the prerequisites for the composite image formation operation in the first embodiment described above, the mask image formation section 32" has already taken the contents of the mask image information file 47". Also, in this second embodiment, the mask image formation section 32" recognizes that the mask image update key is pressed, when the mask image formation section 32" receives the key input data from the basic control section 29 corresponding to the press of any key in the numerical keys.

First of all, similarly to the first embodiment, the noted image information extraction section 31 notifies a position $(X_{S\,W}, Y_{S\,W})$ as position information for the noted image region, angle $\theta_W$ as inclination information for the noted image region, and length $LX_W$ as size information of the noted image region of the mask image formation section 32" as noted image information data WMD. The mask image formation section 32" that has received the noted image information data WMD firstly calculates display position $(X_{E\,3\,1}, Y_{E\,3\,1})$ in the $X_S Y_S$ coordinate system of the first element image $EMM_{31}$ in the additional image 1 by using the above described equations (12) and (13), as well as calculates a magnification ratio $M_{31}$ for expansion or contraction of the element image $EMM_{11}$ by using the above described equation (14).

Next, the mask image formation section 32" carries out expansion or contraction of the element image $EMM_{31}$ with a magnification ratio $M_{31}$ and with origin $O_E$ as a center in the $X_S Y_S$ coordinate system. Continuing on, the mask image formation section 32" rotates the expanded or contracted element image $EMM_{31}$ by angle $\theta_W$ with origin $O_E$, a center in the $X_S Y_S$ coordinate system. The element image $EMM_{31}$ that has been expanded or contracted and rotated is then arranged in the $X_S Y_S$ coordinate system so as to fit the coordinate position $(X_{E\,3\,1}, Y_{E\,3\,1})$ in the $X_S Y_S$ coordinate system to the position of the origin $O_E$.

Next, the mask image formation section 32" calculates display position $(X_{E\,3\,2}, Y_{E\,3\,2})$ in the $X_S Y_S$ coordinate system of the element image $EMM_{32}$ in the additional image 2 by using the above described equations (15) and (16), and calculates a magnification ratio $M_{32}$ for expansion or contraction of the element image $EMM_{32}$ using the above described equation (17).

Next, the mask image formation section 32" carries out expansion or contraction of the element image $EMM_{32}$ with a magnification ratio $M_{32}$ and with origin $O_E$ as a center in the $X_S Y_S$ coordinate system. Continuing on, the mask image formation section 32" rotates the expanded or contracted element image $EMM_{32}$ by angle $\theta_W$ with origin $O_E$, a center in the $X_S Y_S$ coordinate system. The element image $EMM_{32}$ that has been expanded or contracted and rotated is then arranged in the $X_S Y_S$ coordinate system so as to fit the coordinate position $(X_{E\,3\,2}, Y_{E\,3\,2})$ in the $X_S Y_S$ coordinate system to the position of the origin $O_E$.

Figure 32:
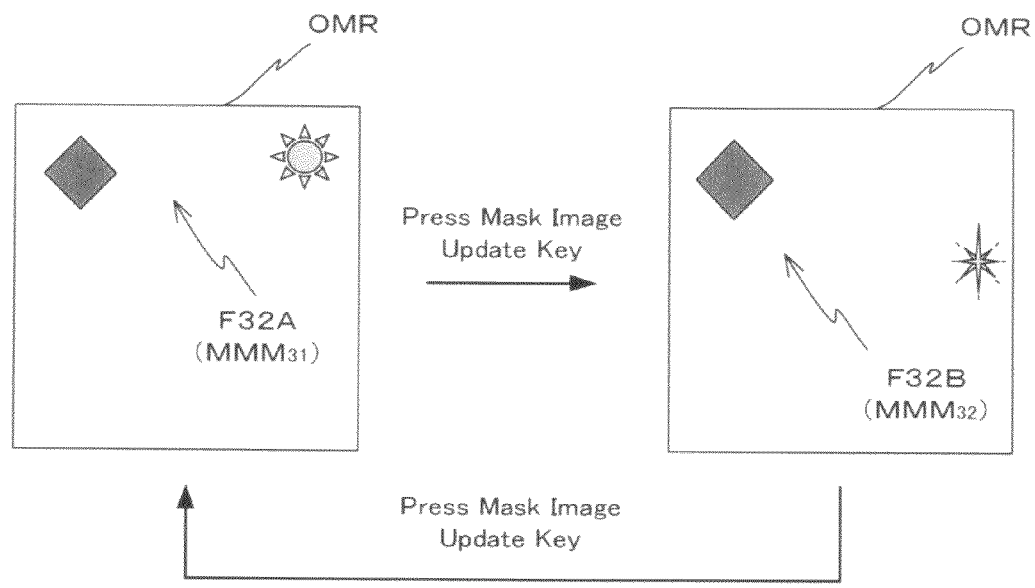
FIG. 32 is a drawing showing an example of a mask image corresponding to FIG. 31.

Based on the above result, the mask image $MMM_{31}$ in image 32A shown in FIG. 32 is formed. The mask image formation section 32" then notifies data of the mask image $MMM_{31}$ to the composite image formation section 33 as mask image data MMD.

Figure 33:
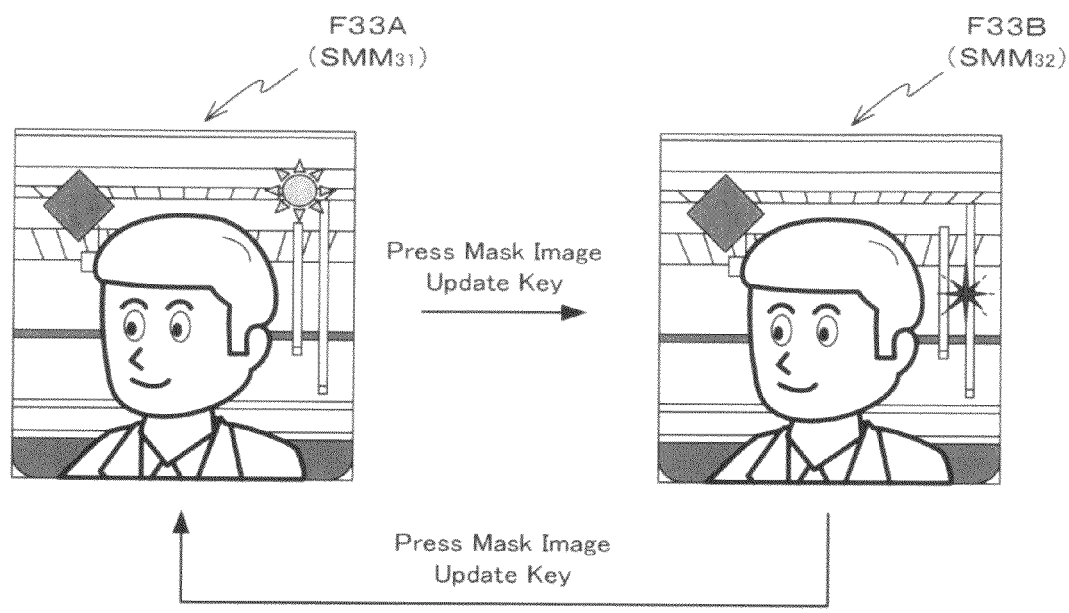
FIG. 33 is a drawing showing an example of a composite image of the second embodiment.

The composite image formation section 33 that has received the mask image data MMD and the original image data OMD forms a composite image $SMM_{31}$ having the mask image $MMM_{31}$ superimposed on the original image data OMM. The composite image $SMM_{31}$ formed in this way is represented as image F33A in FIG. 33.

After that, until receiving the instruction of the mask image update, the mask image formation section 32" forms the mask image displaying element image $EMM_{31}$ in a size of proportion $R_{31}$ with respect to length value $LX_W$ representing the size of the noted image WMM, and displaying element image $EMM_{31}$ in a size of proportion $R_{32}$ with respect to length value $LX_W$, at a position that has a designating relationship to the noted image WMM. The composite image formation section 33 then forms a composite image having the mask image represented by mask image data MMD notified from the mask image formation section 32" superimposed on the original image.

Next, the basic control section 29 notifies the key input data of the mask image formation section 32" when any key in the numerical keys is pressed by the user. The mask image formation section 32" received this notification calculates the display position $(X_{E\,3\,1}, Y_{E\,3\,1})$ in the $X_S Y_S$ coordinate system of the first element image $EMM_{31}$ in the additional image 1 and the magnification ratio $M_{31}$ by using the equations (12) to (14). Then the mask image formation section 32" carries out expansion or contraction of the element image $EMM_{31}$ with a magnification ratio $M_{31}$ and with origin $O_E$ as a center in the $X_S Y_S$ coordinate system. Continuing on, the mask image formation section 32" rotates the expanded or contracted element image $EMM_{31}$ by angle $\theta_W$ around origin $O_E$ of the $X_S Y_S$ coordinate system. The element image $EMM_{31}$ that has been expanded or contracted and rotated is then arranged in the $X_S Y_S$ coordinate system so as to fit the coordinate position $(X_{E\,3\,1}, Y_{E\,3\,1})$ in the $X_S Y_S$ coordinate system to the position of the origin $O_E$.

Next, similarly to the case for the first element image $EMM_{11}$ of the additional image 1, the mask image formation section 32" calculates display position $(X_{E\,3\,3}, Y_{E\,3\,3})$ in the $X_S Y_S$ coordinate system of the third element image $EMM_{33}$ in the additional image 2 and the magnification ratio $M_{33}$ of the third element image $EMM_{33}$, by using the above described equations (18) to (20).

Next, similarly to the case of the first element image $EMM_{31}$ described above, the mask image formation section 32" carries out expansion or contraction of the element image $EMM_{33}$ with a magnification ratio $M_{33}$ and with origin $O_E$ as a center in the $X_E Y_E$ coordinate system. Continuing on, the mask image formation section 32" rotates the expanded or contracted element image $EMM_{33}$ by angle $\theta_W$ around origin $O_E$ as a center in the $X_S Y_S$ coordinate system. The element image $EMM_{33}$ that has been expanded or contracted and rotated is then arranged in the $X_S Y_S$ coordinate system so as to fit the coordinate position $(X_{E\_3\_3}, Y_{E\_3\_3})$ in the $X_S Y_S$ coordinate system to the position of the origin $O_E$.

The result of the above processing is that the mask image $MMM_{32}$ shown as the image F32B in FIG. 32 is formed. The mask image formation section 32" then notifies data of the mask image $MMM_{32}$ to the composite image formation section 33 as mask image data MMD.

The composite image formation section 33 that has received this mask image data MMD and the original image data OMD forms a composite image $SMM_{32}$ having the mask image $MMM_{32}$ superimposed on the original image OMM. The composite image $SMM_{32}$ formed in this way is represented as image F33B in FIG. 33.

After that, until any key in the numerical keys is pressed, the mask image formation section 32" forms the update mask image displaying element image $EMM_{31}$ in a size of proportion $R_{31}$ with respect to length value $LX_W$ representing the size of the noted image WMM, and displaying element image $EMM_{33}$ in a size of proportion $R_{33}$ with respect to length value $LX_W$, at a position that has a designating relationship to the noted image WMM. The composite image formation section 33 then forms an update composite image having the mask image represented by mask image data MMD notified from the mask image formation section 32" superimposed on the original image.

In this manner, every pressing of any numerical keys, the mask image formation section 32", similarly to above, sequentially repeats to form the mask image that uses the above described element image $EMM_{31}$ and the element image $EMM_{32}$, and the mask image that uses the element image $EMM_{31}$ and the element image $EMM_{33}$, in time sequence. The composite image formation section 33 then successively forms composite images having the mask images represented by mask image data MMD notified from the mask image formation section 32 superimposed on the original image.

The composite image data SMD formed in the above mentioned manner is reported from the composite image formation section 33 to the basic control section 29. The basic control section 29, which received the composite image data SMD, displays the composite image SMM on the display section or transmits the composite image SMM via transmission section 22 according to the instruction by the user via the operation section 22.

As has been described above, with this embodiment, first of all, the region of the noted image WMM is identified in the original image OMM, and then the noted image information WMD, which include the information related to the position and the size of the region of the noted image WMM in the original image OMM, is extracted. Continuing on, an initial mask image to be superimposed on the original image OMM is formed, based on the noted image information and the initial mask image information stored in the object information section 40". The composite image formation section 33 then sequentially forms the initial composite image having the initial mask images superimposed on the original image OMM.

When any key in the numerical keys is pressed during display of the initial composite image, the mask image formation section 32" forms an update mask image superimposed on the original image OMM, based on the noted image information and the update mask image information stored in the object information section 40". The composite image formation section 33 then sequentially forms the update composite image having the update mask images superimposed on the original image OMM.

After that, every pressing of any numerical keys, the mask image formation section 32" forms a next update mask image superimposed on the original image OMM, based on the noted image information and the next update mask image information. The composite image formation section 33 then sequentially forms the next update composite image having the update mask images superimposed on the original image OMM.

Therefore according to this embodiment, it is possible to display the update mask image formed by composing the original image OMM and the update mask image, which is changed sequentially in the predetermined order, every pressing of any numerical keys.

Also, according to this embodiment, similar to the first embodiment, the effect for the mask image forming is taken without the effect being due to be assigned the proper object to the key in the numerical keys and the effect being due to be automatically sequential change of the mask images.

Note that, with the above described second embodiment, the object information section 40" includes only one mask image information file 47. However, the object information section 40" includes a plurality of image information files.

Also, with the above described second embodiment, any key in the numerical keys works as the mask image update key, however, the variety and the number of the mask image update key can be determined optionally.

Also, with the above described first and second embodiments, a key for switching object is assigned to a numerical key, however, other kind key may be assigned as that for switching the object.

Also, with the above described first and second embodiments, the original image is a moving picture, but the present invention can also be applied to cases where the original image is a still image.

Also, with the above described first and second embodiments, image formation resulting from light passing through the imaging optical system 18 that images in a so-called self portrait state made the original image, but it is also possible to make image formation resulting from light passing through the imaging optical system 19 that images in a so-called other party shooting state to be made the original image. It is also possible for an image stored in the storage section 23 to be made the original image.

Also, with the above-described first and second embodiments, no consideration has been given to structure along the depth of the noted objects in the noted image region of the original image, and image elements using in the mask image are also created with two-dimensional model. However, it is also possible to consider structure along the depth of the noted objects in the noted image region, and to create element image used in the mask imaged with three-dimensional models. In this case, even if noted objects are moving, having a rotational component about an axis parallel to the display screen, it is possible to form a mask image that affords no discomfort by tracking this rotation.

Also, the number of element imaged displayed at the same time is arbitrary. The number of element images carrying out time sequence display is also arbitrary.

Also with the above described first and second embodiments, the mask image information file is comprised of the display designation file and the element information file. It is also possible, however, for the mask image information file to further comprise an element image preview file, and when element image preview is designated, to perform element image preview on the display section 13 by referencing the element image preview file.

Also, in the embodiments, it is possible to commence formation of the mask image using occurrence of the specified phenomenon as a trigger after specified phenomenon occurrence is determined for determining whether or not a predetermined phenomenon has occurred on the noted image region based on noted image information. For example, when the noted image is a facial image of a specified person, when the eyelids are closed, it is possible to form a composite image with tears flowing from positions of the eyes.

Also, with the above-described first and second embodiments, the present invention has been applied to a cellar phone unit, but it is also possible to apply the present invention to various other mobile communication terminals. It is also possible to apply the present invention to general electronic appliances such as a personal computer.

As has been described above, it is possible to apply the object outputting method and the information processing apparatus of the present invention to output the object with displaying the image included in the original image on the display means simultaneously.

What is claimed is:

1. An object outputting method, comprising the steps of: displaying an original image on a display means of an information processing apparatus; identifying when a key on a key input means of the information processing apparatus is operated, the key having an object specifically assigned thereto; when said key operation is identified, checking a database to find the object corresponding to the key operation; and when said object is found, outputting an image composed of the object and the original image simultaneously on the display means.

2. The object outputting method of claim 1, wherein
the object assigned uniquely to the identified key is an mask image, and
a composite image including the mask image is displayed on the display means in the object outputting step.

3. The object outputting method of claim 2, wherein the object outputting step comprises:
specifying an noted image region, being a region for an image to be focused on, in an original image, and extracting noted image information containing information relating to position and size of the noted image within the original image;
forming the mask image, based on the noted image information, and a mask image information containing at least one relationship information representing a relationship of position and size of the mask image to the noted image region, element image selection information representing selection of information of specified element images respectively corresponding to the relationship information, and at least one element image information selected using the element image selection information, and being corresponding to the identified key; and
forming a composite image having the mask image superimposed on a noted image containing image that contains the noted image inside the noted image region at the same location and same size as for the original image.

4. The object outputting method of claim 3, wherein
the noted image-containing image is the original image.

5. The object outputting method of claim 3, wherein
the mask image information file further includes background image selection information showing that information of a specified background image has been selected, and
in the step of forming the composite image, a specified display image containing the noted image is cut from the original image, and the composite image is formed after a background addition image has been made the noted image containing image having the specified display image superimposed on the specified background image at the same position and size as for the original image.

6. The object outputting method of claim 3, wherein
the mask image information further comprises respective execution time information for graphic display fixed by combining the relationship information and graphic selection information corresponding to the relationship information.

7. The object outputting method of claim 6, wherein
the mask image information further comprises information for display of a plurality of types of graphic display in time sequence, fixed by combining the relationship information and graphic selection information corresponding to the relationship information, and for time sequence display designation for designating repeat of time sequence display.

8. The object outputting method of claim 3, wherein
the mask image information further comprises simultaneous display designation information for designating display of a plurality of types of graphic display at the same time, fixed by combining the relationship information and graphic selection information corresponding to the relationship information.

9. The object outputting method of claim 3, wherein
the information relating to the position of the noted image region contains position information for a representative point of the noted image region of the original image.

10. The object outputting method of claim 9, wherein
the information relating to the position of the noted image region contains inclination information for the noted image region of the original image.

11. The object outputting method of claim 10, wherein
in the relationship information, the representative point of the noted region is made an origin, and coordinate position information determining direction of a coordinate axis based on inclination of the noted image region is included as display position information for the specified image.

12. The object outputting method of claim 3, wherein
the relationship information contains proportion information for size of the noted image region and size for display time of a specified graphic.

13. The object outputting method of claim 1, wherein
the information processing apparatus further comprises sound output means, and
the object assigned uniquely to the identified key is a sound object.

14. The object outputting method of claim 1, wherein
when the key identified in the identifying step is a mask image update key, an update composite image including an update mask image to be displayed next on the display means in the object outputting step, wherein the update mask image is selected from a plurality of mask images of which displaying order is predetermined.

15. The object outputting method of claim 14, wherein the object outputting step comprises:

specifying an noted image region, being a region for an image to be focused on, in an original image, and extracting noted image information containing information relating to position and size of the noted image within the original image;

forming the update mask image, based on the noted image information, and a update mask image information containing at least one relationship information representing a relationship of position and size of the update mask image to the noted image region for the update mask image, element image selection information representing selection of information of specified element images respectively corresponding to the relationship information, and at least one element image information selected using the element image selection information; and forming an update composite image having the update mask image superimposed on a noted image containing image that contains the noted image inside the noted image region at the same location and same size as for the original image.

16. The object outputting method of claim 15, wherein the noted image-containing image is the original image.

17. The object outputting method of claim 15, wherein the update mask image information file further includes background image selection information showing that information of a specified background image has been selected, and in the step of forming the update composite image, a specified display image containing the noted image is cut from the original image, and the update composite image is formed after a background addition image has been made the noted image-containing image having the specified display image superimposed on the specified background image at the same position and size as for the original image.

18. The object outputting method of claim 15, wherein the information relating to the position of the noted image region contains position information for a representative point of the noted image region of the original image.

19. The object outputting method of claim 18, wherein the information relating to the position of the noted image region contains inclination information for the noted image region of the original image.

20. The object outputting method of claim 19, wherein in the relationship information, the representative point of the noted region is made an origin, and coordinate position information determining direction of a coordinate axis based on inclination of the noted image region is included as display position information for the specified image.

21. The object outputting method of claim 15, wherein the relationship information contains proportion information for size of the noted image region and size for display time of a specified graphic.

22. The object outputting method of claim 1, wherein the original image is a moving picture.

* * * * *